US012388639B2

(12) United States Patent
Ersoy

(10) Patent No.: US 12,388,639 B2
(45) Date of Patent: Aug. 12, 2025

(54) ENCRYPTION AND DECRYPTION USING PHASE RECOVERY

(71) Applicant: Gerchberg Ophthalmic Dispensing, PLLC, New York, NY (US)

(72) Inventor: Okan Ersoy, West Lafayette, IN (US)

(73) Assignee: WAVEFRONT ANALYSIS SYSTEMS LLC, New York, NY (US)

( * ) Notice: Subject to any disclaimer, the term of this patent is extended or adjusted under 35 U.S.C. 154(b) by 169 days.

(21) Appl. No.: 18/162,926

(22) Filed: Feb. 1, 2023

(65) Prior Publication Data

US 2023/0246832 A1 Aug. 3, 2023

Related U.S. Application Data

(60) Provisional application No. 63/305,335, filed on Feb. 1, 2022.

(51) Int. Cl.
| | |
|---|---|
| *H04L 9/08* | (2006.01) |
| *H04L 9/06* | (2006.01) |
| *H04L 9/12* | (2006.01) |
| *H04L 9/40* | (2022.01) |
| *H04L 12/22* | (2006.01) |

(52) U.S. Cl.
CPC .......... *H04L 9/0894* (2013.01); *H04L 9/0618* (2013.01); *H04L 9/12* (2013.01); *H04L 12/22* (2013.01); *H04L 63/04* (2013.01)

(58) Field of Classification Search
CPC ....... H04L 9/06; H04L 9/0618; H04L 9/0894; H04L 9/12; H04L 12/22; G06F 17/141
See application file for complete search history.

(56) References Cited

U.S. PATENT DOCUMENTS

| | | |
|---|---|---|
| 5,274,716 A | 12/1993 | Mitsuoka |
| 5,426,521 A | 6/1995 | Chen |
| 5,454,047 A | 9/1995 | Chang |
| 5,768,242 A | 6/1998 | Juday |
| 6,097,856 A | 8/2000 | Hammond, Jr. |

(Continued)

FOREIGN PATENT DOCUMENTS

CN    101345616 A    *    1/2009

OTHER PUBLICATIONS

Ersoy "Diffraction, Fourier Optics and Imaging," A Wiley-Interscience Publication, Table of Contents, Nov. 2006. 16 pages.

(Continued)

*Primary Examiner* — Boris D Grijalva Lobos
(74) *Attorney, Agent, or Firm* — Riverside Law LLP

(57) ABSTRACT

Embodiments include methods and systems for improving information security of an input signal. Embodiments include encrypting the input signal, based on concurrently executing a plurality of sequences of transformations of the input signal. Embodiments include, for each sequence of the plurality of sequences: performing a discrete Fourier transform on the input signal; preserving amplitude information of the input signal; and ciphering the input signal based on a unique key that corresponds to the sequence. In embodiments, executing each one of the sequences produces a corresponding encrypted data signal. In embodiments, recreation of the input signal requires each of the encrypted data signals and the corresponding unique key.

20 Claims, 60 Drawing Sheets

(56) References Cited

U.S. PATENT DOCUMENTS

| | | | |
|---|---|---|---|
| 6,229,649 B1 | 5/2001 | Woods | |
| 6,369,932 B1 | 4/2002 | Gerchberg | |
| 6,545,790 B2 | 4/2003 | Gerchberg | |
| 6,885,442 B1 | 4/2005 | Nugent | |
| 6,906,839 B2 | 6/2005 | Gerchberg | |
| 8,040,595 B2 | 10/2011 | Gerchberg | |
| 8,184,298 B2 | 5/2012 | Popescu | |
| 8,520,213 B2 | 8/2013 | Popescu | |
| 8,837,045 B2 | 9/2014 | Popescu | |
| 9,052,180 B2 | 6/2015 | Popescu | |
| 9,404,857 B2 | 8/2016 | Popescu | |
| 10,132,609 B2 | 11/2018 | Popescu | |
| 11,237,059 B1* | 2/2022 | Ersoy | G01J 3/0229 |
| 11,699,242 B2* | 7/2023 | Yoon | G06T 15/205 |
| | | | 345/419 |
| 2002/0060831 A1 | 5/2002 | Gerchberg | |
| 2011/0085173 A1 | 4/2011 | Waller | |
| 2017/0003491 A1 | 1/2017 | Waller | |
| 2017/0019253 A1* | 1/2017 | Baptist | H04L 67/10 |
| 2017/0059845 A1 | 3/2017 | Waller | |
| 2017/0063531 A1* | 3/2017 | Sullivan | G06F 21/6209 |
| 2017/0146788 A1 | 5/2017 | Waller | |
| 2018/0048811 A1 | 2/2018 | Waller | |
| 2018/0217629 A1* | 8/2018 | MacFaden | G06E 3/003 |
| 2019/0107655 A1 | 4/2019 | Waller | |
| 2019/0227490 A1 | 7/2019 | Waller | |
| 2019/0310374 A1 | 10/2019 | Gerchberg | |
| 2020/0249095 A1 | 8/2020 | Milster | |
| 2023/0245440 A1* | 8/2023 | Ersoy | G06V 10/898 |
| | | | 382/100 |
| 2023/0280692 A1* | 9/2023 | Ersoy | G03H 1/0808 |
| | | | 359/9 |

OTHER PUBLICATIONS

Gerchberg "A New Approach to Phase Retrieval of a Wave Front," Journal of Modern Optics, vol. 49, No. 7, pp. 1185-1196, 2002.

Gerchberg "Super-Resolution Through Error Energy Reduction," Optica ACTA, vol. 21, No. 9, pp. 709-720, 1974.

Gerchberg, et al. "A Practical Algorithm for the Determination of Phase from Image and Diffraction Plane Pictures," Optik, vol. 35, No. 2, pp. 237-246, 1972.

* cited by examiner

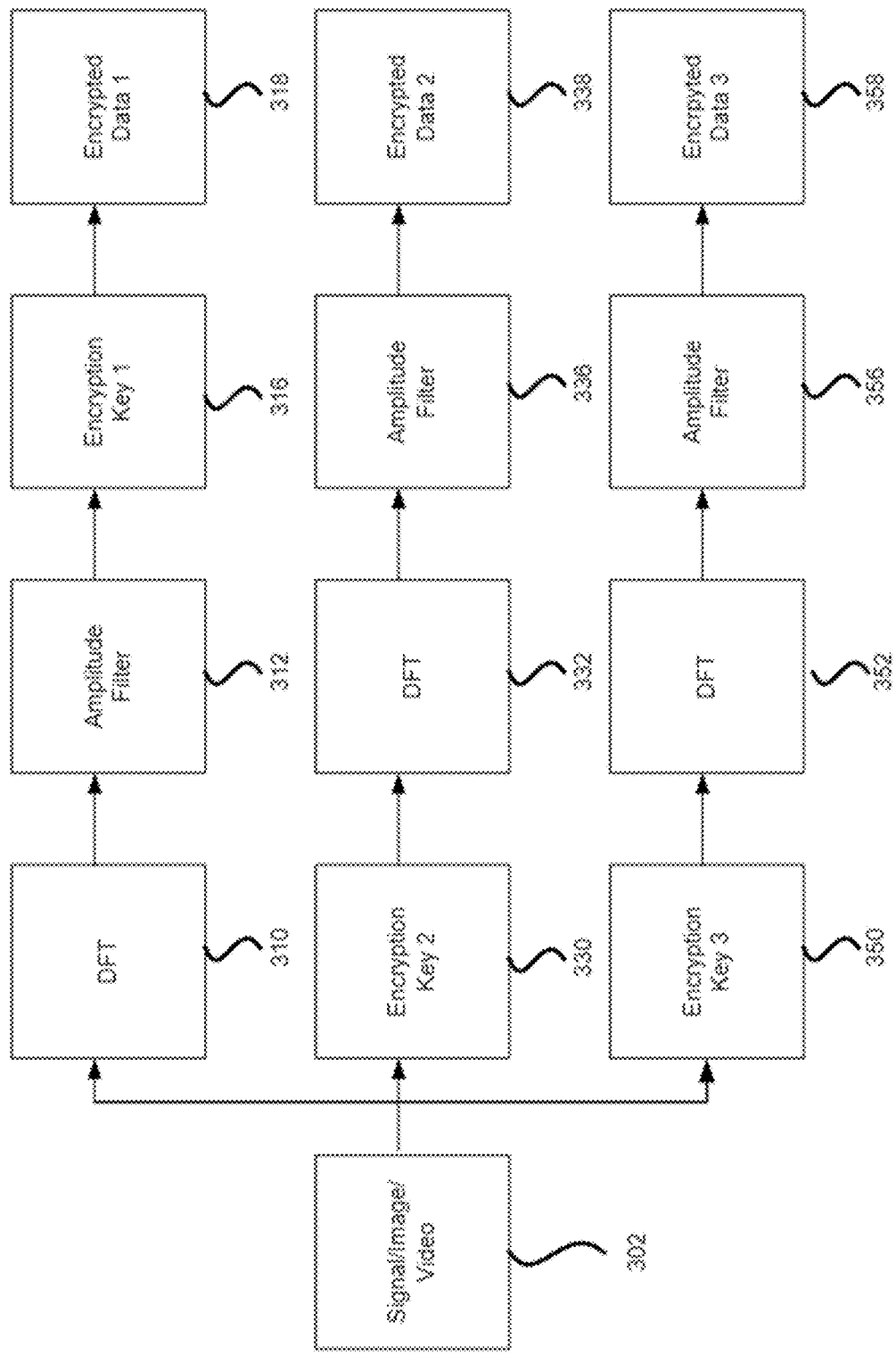
Fig. 3C-I

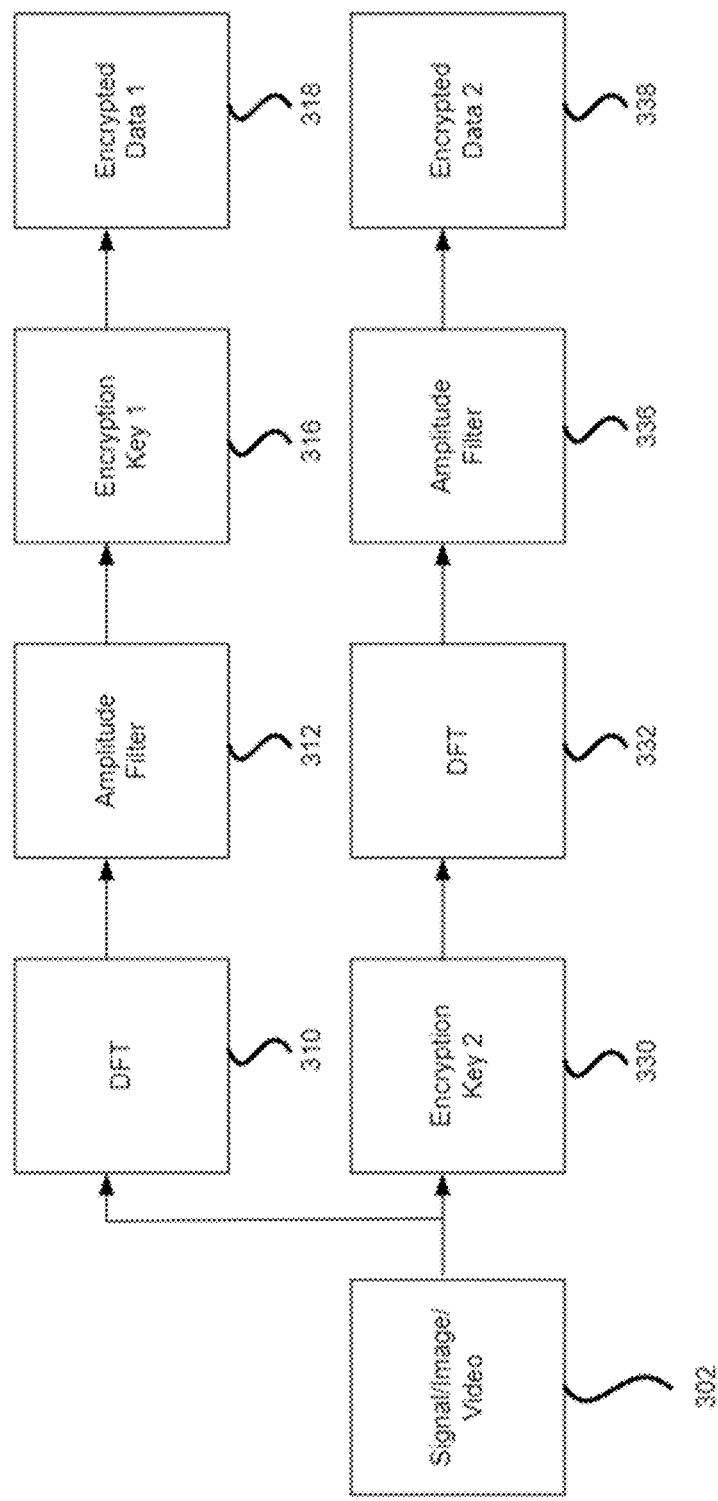
Fig. 3C-II

ENCRYPTION AND DECRYPTION USING PHASE RECOVERY

CROSS-REFERENCE TO RELATED APPLICATIONS

This application claims priority to U.S. Provisional Patent Application No. 63/305,335, filed Feb. 1, 2022 incorporated herein by reference in its entirety.

TECHNICAL FIELD

The present invention relates to, and more particularly to secure encryption and decryption of data. Especially in two and higher dimensional data, phase carries more information than amplitude.

BACKGROUND

Ultra secure encryption and decryption of data has become of topmost concern in today's marketplace. In this arena, optically inspired methods and systems are among the most competitive approaches [F. Refrigier, B. Javidi, Optical image encryption based on input plane and Fourier plane random encoding, Vol. 20, No 7, pp. 767-769, *Optics Letters*, Apr. 1, 1995]. [B. Javidi, Optical security system using Fourier plane encoding, U.S. Pat. No. 8,150,033 B2, Apr. 3, 2002]. [B. Javidi, editor, Optical Imaging Sensors and Systems for Homeland Security Applications, Springer, 2006].

Most such systems are linear in nature. Hence, they are typically attacked by techniques involving linear algebra and the like. This invention is nonlinear since it is based on keeping the amplitudes of transformed data sets and discarding the corresponding phases. Especially in two and higher dimensional data, phase carries more information than amplitude. During decryption, perfect recovery of phase information is achieved by G2. Here the word 'perfect' is used in the sense of acceptable accuracy for human and machine expert evaluation, especially for cryptography. Phase recovery methods have been around for a number of years, but it was not known until recently that perfect recovery is possible with G2 in a simple way by designing the encryption keys as discussed in this invention.

In many coherent systems, phase is lost because what is measurable is intensity proportional to the square of the amplitude. There are indirect ways to recover phase. Holography discovered by Dennis Gabor is one of them [D. Gabor, "A new microscopic principle," *Nature*, 161, 777, 1948]. It achieves amplitude and phase recording by introducing a reference wave. This has a lot to do with modulation principles used in communications. Another way is the Gerchberg-Saxton algorithm (GSA) [A, R. W. Gerchberg, W. O. Saxton, "A practical algorithm for the determination of the phase from image and diffraction plane pictures," *Optik*, Vol. 35, pp. 237-246, 1972] which involves measurements on two related planes (input plane and Fourier plane). This has been very influential in a lot of works especially involving diffractive optics. G2 is related to GSA, but is different in the way phase is guaranteed to be recovered. G2 is much better than GSA in terms of quality of the results in phase and image recovery. Since reliability is very important in cryptography, GSA is not a competitor to G2 in this area.

Some other well-known methods for phase recovery are the error reduction (ER) algorithm [A, R. W. Gerchberg, W. O. Saxton, "A practical algorithm for the determination of the phase from image and diffraction plane pictures," *Optik*, Vol. 35, pp. 237-246, 1972]. [B, J, R, Fienup, 'Reconstruction of an object from its Fourier transform,' *Optics Letters*, Vol. 3, No 1, pp. 27-29, July 1978]. [J. R. Fienup, 'Phase retrieval algorithms, a comparison,' *Applied Optics*, Vol. 21, No. 15, pp. 2758-2769, 1 Aug., 1982] the averaged successive relaxations (ASR) [C. H. Spence, 'Diffractive (lensless) imaging,' Ch. 19, *Science of Microscopy*, edited by P. W. Hawkes, J. C. H. Spence, Springer, 2007] the hybrid projection reflections (HPR) [H. H. Bauschke, P. L. Combettes, D. Russell Luke, 'Hybrid projection-reflection method for phase retrieval,' *J. Optical Soc. Am.* A, Vol. 20, No. 6, pp. 1025-134 Jun. 2003], and relaxed averaged alternating reflections (RAAR) [D. Russell Luke, 'Relaxed averaged alternating reflections for diffraction imaging,' *Inverse Problems*, Vol. 21, pp. 37-50, 2005]. There are considerably more recent number of algorithms especially based on utilizing more effective optimization methods such as SO2D and SO4D [Stefano Marchesini, 'Phase retrieval and saddle-point optimization,' *J. Optical Soc. Am.* A, Vol. 24, No. 10, pp. 3289-3296 October 2007]. The common theme in all these algorithms is to achieve best phase recovery by using prior information and constraints. Nonnegativity, support information, and amplitude information are the ones most commonly used as prior information.

Experimental work indicates that there is usually not enough prior information with a single measurement of amplitudes in the Fourier domain for perfect phase and image recovery. In other words, the recovery results with given data may be better with some methods than others, but the recovery is usually not perfect, namely it is often approximate. This is not tolerable in cryptography.

G2 involves further development of GSA by introducing an integer number "M" of independent measurements on input and Fourier planes especially by using phase/amplitude filters. This is similar to measuring a quantity of interest in M independent ways and then doing averaging or consensus between the results. In this way, more prior information is provided, resulting in reliable phase recovery. G2 is believed to be the first such method for reliable phase recovery. It is also easy, effective and practical. As a consequence, it is central to the proposed patent disclosure.

As used herein, the terms discrete Fourier transform (DFT) and Fourier transform are used interchangeably and refer to the same process.

SUMMARY OF THE DISCLOSURE

An embodiment of the present invention provides a method for improving information security of an input signal. The method includes encrypting the input signal, based on concurrently executing a plurality of sequences of transformations of the input signal. The method includes, for each sequence of the plurality of sequences: (i) performing a discrete Fourier transform on the input signal; (ii) preserving amplitude information of the input signal; and (iii) ciphering the input signal based on a unique key that corresponds to the sequence. In the method, executing each one of the sequences produces a corresponding encrypted data signal. In the method, recreation of the input signal requires each of the encrypted data signals and the corresponding unique key.

In any embodiment, the encrypting is performed by a processor or a spatial light modulator (SLM) and associated optics.

Any embodiment may include removing the spectral phase information from the input signal while preserving, on the spectral plane, the amplitude information of the input signal.

Any embodiment may include increasing processing speed of the Fourier transform by zero padding the input signal.

In any embodiment, the encrypting may be performed non-linearly.

In any embodiment, within a first sequence of the plurality of sequences, the discrete Fourier transform may be performed before removing the phase information.

In any embodiment, within the first sequence of the plurality of sequences, the ciphering may be performed after removing the phase information.

In any embodiment, within remaining sequences of the plurality of sequences, the ciphering may be performed before the discrete Fourier transform.

In any embodiment, within the remaining sequences of the plurality of sequences, removing the phase information may be performed after the discrete Fourier transform.

In any embodiment, the plurality of sequences may be three sequences.

Another embodiment of the present invention provides a decryption method. The decryption method includes receiving a plurality of encrypted data signals without phase information. The decryption method further includes deciphering, each encrypted data signal of the plurality of encrypted data signals, based on a unique key that corresponds to the encrypted data signal. The decryption method further includes performing recovery of phase of an original input signal associated with the encrypted signals in an iterative manner and including averaging the deciphered data signals.

In any embodiment, the deciphering may be performed by a processor or a spatial light modulator (SLM) and associated optics.

In any embodiment, the recovery of the phase may form a partially recovered version of at least 98 percent of an original phase of the original input signal.

In any embodiment, the recovery of the phase may form a partially recovered version of at least 99 percent of an original phase of the original input signal.

In any embodiment, the recovery of the phase may form a partially recovered version of at least 99.9 percent of an original phase of the original input signal.

Any embodiment may include deciphering each encrypted data signal based on an inverse of the unique key.

In any embodiment, performing recovery of the phase may include performing a discrete inverse Fourier transform on each of the deciphered data signals. In any embodiment, performing recovery of the phase may include assigning random or pseudorandom phases to each of the deciphered data signals.

An embodiment of the present invention provides an encryption system for improving information security of an input signal. The encryption system includes an encryption unit configured to encrypt the input signal, based on concurrent execution of a plurality of sequences of transformations of the input signal, and for each sequence of the plurality of sequences: (i) perform a discrete Fourier transform on the input signal; (ii) preserve amplitude information of the input signal; and (iii) cipher the input signal based on a unique key that corresponds to the sequence, wherein the execution of each one of the sequences produces a corresponding encrypted data signal, and recreation of the input signal requires each of the encrypted data signals and the corresponding unique key.

In any embodiment, the encryption unit may include a processor or a spatial light modulator (SLM) and associated optics.

An embodiment of the present invention provides a decryption system for improving information security of encrypted data signals. The decryption system includes: a decryption unit configured to receive a plurality of encrypted data signals without phase information; deciphering, by the decryption unit, each encrypted data signal of the plurality of encrypted data signals, based on a unique key that corresponds to the encrypted data signal; and performing recovery of phase of an original input signal associated with the encrypted signals in an iterative manner and including averaging the deciphered data signals.

In any embodiment, the decryption unit may include a processor or a spatial light modulator (SLM) and associated optics.

BRIEF DESCRIPTION OF THE DRAWINGS

The foregoing features of embodiments will be more readily understood by reference to the following detailed description, taken with reference to the accompanying drawings, in which:

FIG. 3A, FIG. 3B, FIG. 3C-I, and FIG. 3C-II show embodiments of encryption flow diagrams, each of which may be included in any of the systems of FIG. 1A, FIG. 1B, FIG. 2A, FIG. 2B, FIG. 2C, and FIG. 2D.

FIG. 5 and FIG. 8 are visually identical.

FIG. 9 and FIG. 12 are visually identical.

FIG. 13 and FIG. 16 are visually identical.

FIG. 17 and FIG. 20 are visually identical.

FIG. 21 and FIG. 24 are visually identical.

FIG. 25 and FIG. 28 are visually identical.

FIG. 29 and FIG. 32 are visually identical.

FIG. 33 and FIG. 36 are visually identical.

DETAILED DESCRIPTION

Figure 1A:
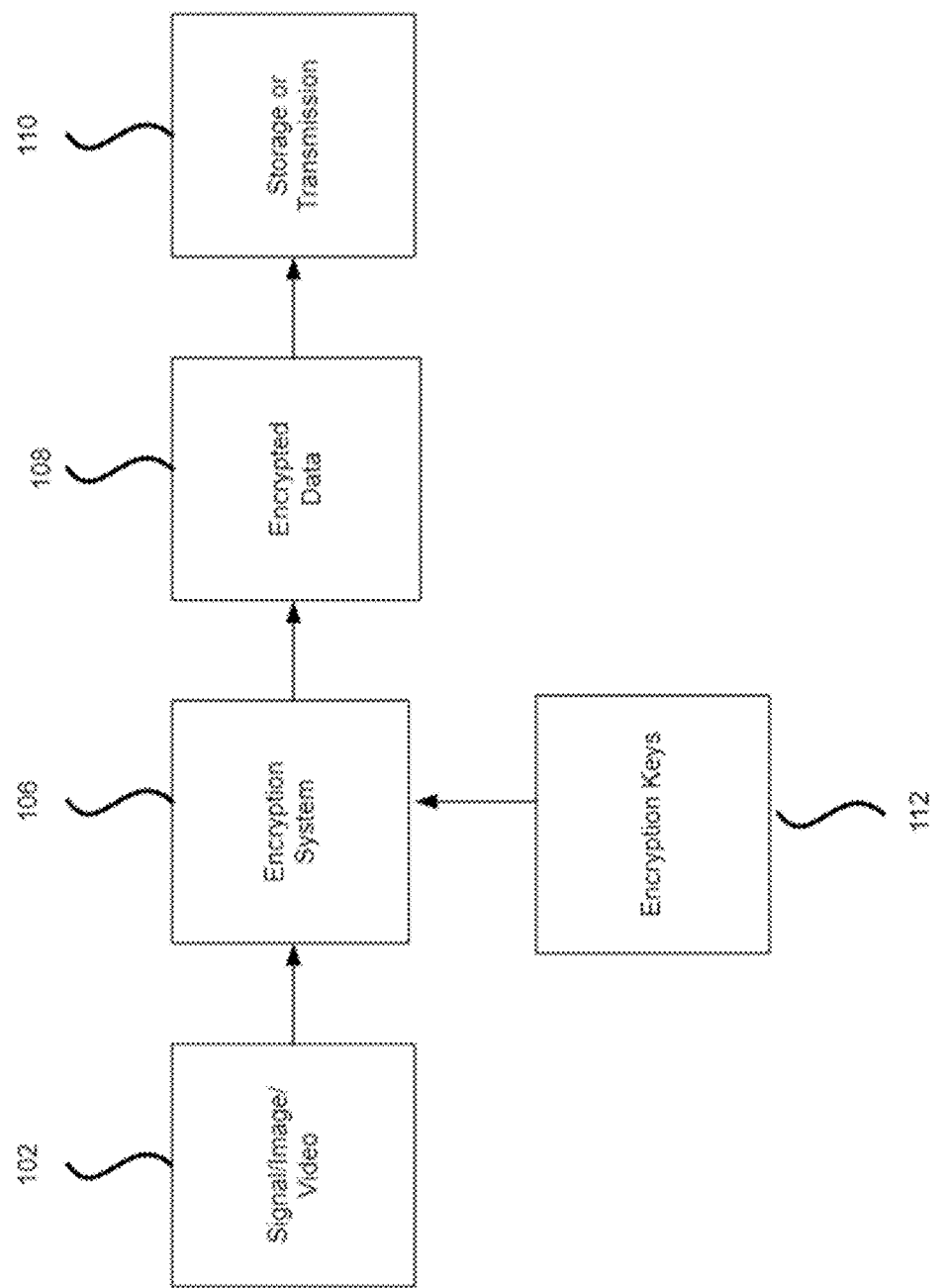
FIG. 1A shows an encryption system.

Definitions. As used in this description and the accompanying claims, the following terms shall have the meanings indicated, unless the context otherwise requires:

A "set" has at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

INTRODUCTION

According to some embodiments, a method of encrypting and decrypting information using phase recovery with Gerchberg's second method is disclosed.

Information is assumed to be in the form of numerical vectors, matrices or tensors. They can be real or complex. For example, coherent waves would represent complex data. If the data is M-dimensional, the discrete Fourier transform (DFT) to be used is also M-dimensional. In the rest of the disclosure, complex information will be referred to as waves. Physical waves will be referred to as coherent waves since the present invention does not consider incoherent waves.

The method includes transforming a set of data with the discrete Fourier transform (DFT), followed by encrypting the amplitude of the transformed data with an encryption key, and discarding the phase of the transformed data, and several other "phase/amplitude" (e.g., meaning phase, or phase and amplitude, herein) encryption keys at the input to the system, transforming the set of each encrypted data with the DFT, keeping the amplitude of each transformed data, and discarding the corresponding phase of the transformed data. The method may also include encrypting the amplitude of each transformed data with another encryption key. Additionally, the method may include repeating the above process with new encryption keys. In some embodiments, the keys are also numerical and M-dimensional.

According to some embodiments, decryption of encrypted information is carried out by recovering the phase of the transformed data with Gerchberg's second method, referred to as "G2" herein [R. W. Gerchberg (2002): A new approach to phase retrieval of a wave front, Journal of Modern Optics, 49:7, 1185-1196]. [R. W. Gerchberg, System and method for recovering phase information of a wave front, U.S. Pat. No. 6,369,932 B1, Apr. 9, 2002]. [R. W. Gerchberg, System and method for recovering phase information of a wave front, U.S. Pat. No. 6,545,790 B2, Apr. 8, 2003]. [R. W. Gerchberg, Light microscope with novel digital method to achieve superresolution, U.S. Pat. No. 8,040,595 B2, Oct. 18, 2011]. For this purpose, the inverses of the output encryption keys are first used to recover the amplitudes of the transformed data. Gerchberg's second method ("G2") is initiated with random phase assignment to each transformed data, inverse DFT transforming the resulting transformed data, and averaging the results to obtain a single estimate of the original data. This process is repeated a number of iterations until convergence, by using the input encryption keys, always replacing the current output amplitude by the true output amplitude and utilizing the current output phase.

According to some embodiments, the encryption/decryption method developed relies heavily on G2 for phase retrieval, originally developed for wave propagation applications which are usually 3 or 4 dimensional. In such systems, phase is much more important than amplitude. The phase problem goes back to Rayleigh who wrote about it in 1892. Phase recovery has been a celebrated problem in succeeding years, and this process has accelerated after 1960's when the laser and other important sources of coherent radiation were discovered.

G2

G2 involves taking a number of successive measurements by utilizing phase/amplitude masks to be referred to as keys in the input space [R. W. Gerchberg (2002): A new approach to phase retrieval of a wave front, Journal of Modern Optics, 49:7, 1185-1196]. [R. W. Gerchberg, System and method for recovering phase information of a wave front, U.S. Pat. No. 6,369,932 B1, Apr. 9, 2002]. [R. W. Gerchberg, System and method for recovering phase information of a wave front, U.S. Pat. No. 6,545,790 B2, Apr. 8, 2003]. [R. W. Gerchberg, Light microscope with novel digital method to achieve superresolution, U.S. Pat. No. 8,040,595 B2, Oct. 18, 2011]. After some processing in the Fourier plane and inverse propagation to the input plane, the results are averaged by summing them, other prior information is included in the input domain, if any, and the process is cycled through a number of iterations until convergence.

A major question is how many masks are needed. Since each mask means another set of measurements, the fewer masks the better. It was experimentally discovered that G2 is capable of perfect phase recovery by utilizing several masks. By using a window bordered by an opaque region, G2 can achieve perfect information recovery if one transparent (clear) mask and a second mask is used. The second mask can be a random bipolar binary mask, or a phase mask or a phase/amplitude mask. The second mask can also be replaced by two pairs of unipolar binary masks. Here each pair consists of two complimentary unipolar binary masks, in the sense of 0's and 1's being interchanged.

Other Methods for Phase Recovery Utilizing Multiple Measurements

There is growing realization in the research community that multiple measurements are necessary if high quality phase and image recovery are required. Quite recently, a number of such methods have been published in the literature. Below a discussion is presented on some methods having multiple measurements with some similarity to the Gerchberg method.

In the phaselift method by Candes et al. [A, R. W. Gerchberg, W. O. Saxton, "A practical algorithm for the determination of the phase from image and diffraction plane pictures," Optik, Vol. 35, pp. 237-246, 1972]. [B, J, R, Fienup, 'Reconstruction of an object from its Fourier transform,' Optics Letters, Vol. 3, No 1, pp. 27-29, July 1978]. [J. R. Fienup, 'Phase retrieval algorithms, a comparison,' Applied Optics, Vol. 21, No. 15, pp. 2758-2769, 1 Aug., 1982], the initial approach is the same as in the Gerchberg method. In other words, a number of measurements are taken by using a number of masks. They also mention the use of optical grating, ptychography and oblique illuminations as substitutes for masks. However, masks are the major mechanism used in their papers. The averaging step in the Gerchberg method is replaced by a convex optimization method, which is also related to the matrix completion or matrix recovery problems. Since the step of averaging in the Gerchberg method is much simpler and capable of perfect recovery as illustrated in this disclosure, it is questionable whether replacing the averaging step by a much more complex convex optimization step is necessary. Regardless, the phaselift method has become quite popular, and there are a number of recent related papers by others on the same topic.

In the Fourier-weighted projections method by Sicairos and Fienup [J. R. Fienup, 'Phase retrieval algorithms, a comparison,' Applied Optics, Vol. 21, No. 15, pp. 2758-2769, 1 Aug., 1982], masks are also used to achieve high quality phase recovery. They propose different types of masks for this purpose.

Ptychography is another method which utilizes multiple diffraction intensity measurements [J. C. H. Spence, 'Diffractive (lensless) imaging,' Ch. 19, Science of Microscopy, edited by P. W. Hawkes, J. C. H. Spence, Springer, 2007]. It was first introduced by Hoppe in the time period 1968-1973, especially for X-ray imaging. Ptychography relies on recording at least 2 diffraction intensities by shifting the illumination function or the aperture function with respect to the object to be imaged by a known amount instead of relying on masks. Thus, there is a moving probe which illuminates part of the object at a time. When there is sufficient amount of overlap between the different parts of illumination, phase recovery can be achieved by an iterative phase retrieval algorithm. Another related algorithm has recently been developed by Sicairos and Fienup based on diverse far field intensity measurements taken after translating the object relative to the known illumination pattern [H. H. Bauschke, P. L. Combettes, D. Russell Luke, 'Hybrid projection-reflection method for phase retrieval,' J. Optical Soc. Am. A, Vol. 20, No. 6, pp. 1025-134 June 2003]. In this work, nonlinear optimization is used.

In summary, multiple diffraction intensity measurements are currently the trend in the research community to solve phase and image recovery problems, for example, leading to diffractive (lensless) imaging. This is especially important in areas such as X-ray and far infrared imaging in which lenses are very expensive. Among the methods discussed, G2 stands out in terms of reliability, simplicity, and speed of computation.

2D. Optically Inspired Methods for Cryptography

Optical systems have inherent parallelism, for example, 2-D Fourier transforms can be computed by lenses at the speed of light. This prompted many methods in optical information processing, and cryptography. The double random phase method by Refregier and Javidi initiated the fast development of optically inspired methods for cryptography [F. Refrigier, B. Javidi, Optical image encryption based on input plane and Fourier plane random encoding, Vol. 20, No 7, pp. 767-769, *Optics Letters*, Apr. 1, 1995]. [B. Javidi, Optical security system using Fourier plane encoding, U.S. Pat. No. 8,150,033 B2, Apr. 3, 2002]. [B. Javidi, editor, Optical Imaging Sensors and Systems for Homeland Security Applications, Springer, 2006]. [Y. Frauel, A. Castro, T. J. Naughton, B. Javidi, Resistance of the double random phase encryption against various attacks, Vol. 15, No 16, pp. 10253-10265, Optics Express, Aug. 6, 2007].

Among many variants, the double random phase encryption can be written in a single equation as $$I_{ciphered} = FT(P_2 \cdot FT(P_1 \cdot I_{input})) \tag{1}$$

where
$I_{input}$=input image (signal)
$I_{ciphered}$=encrypted image (signal)
$P_1$=first random phase mask
$P_2$=second random phase mask
FT=Fourier transform FT can be implemented optically with a lens. In digital implementations, the discrete Fourier transform (DFT) is usually used. It is observed that Eq. (1) represents a linear system. This makes the system vulnerable to plain text attacks [Y. Frauel, A. Castro, T. J. Naughton, B. Javidi, Resistance of the double random phase encryption against various attacks, Vol. 15, No 16, pp. 10253-10265, Optics Express, Aug. 6, 2007]. In the current invention, this problem is eliminated by phase recovery with the G2, resulting in a nonlinear system. As such, in other words, according to some embodiments, the encrypting and/or decrypting herein may be performed non-linearly.

System

Some embodiments include an encryption system, some embodiments include a decryption system, and some embodiments include an overall system that includes both an encryption system and decryption system.

FIG. 1A shows an encryption system 106. The input information is often in the form of an input signal 102 such as audio, an image, and/or video (sequence of images). In some embodiments, the input signal may be of the form of information or data. The encryption system shown in 106 depends on a number of encryption keys shown in 112. The result is encrypted data shown in 108. This is either stored or transmitted as shown in 110.

In some embodiments, as shown in FIG. 1A, an embodiment of the present invention provides an encryption system 106 for improving information security of an input signal 102. The encryption system 106 includes an encryption unit configured to encrypt the input signal, based on concurrent execution of a plurality of sequences of transformations of the input signal, and for each sequence of the plurality of sequences: (i) perform a discrete Fourier transform on the input signal; (ii) preserve amplitude information of the input signal; and (iii) cipher the input signal based on a unique key that corresponds to the sequence, wherein the execution of each one of the sequences produces a corresponding encrypted data signal 108, and recreation of the input signal requires each of the encrypted data signals and the corresponding unique key 112.

Figure 1B:
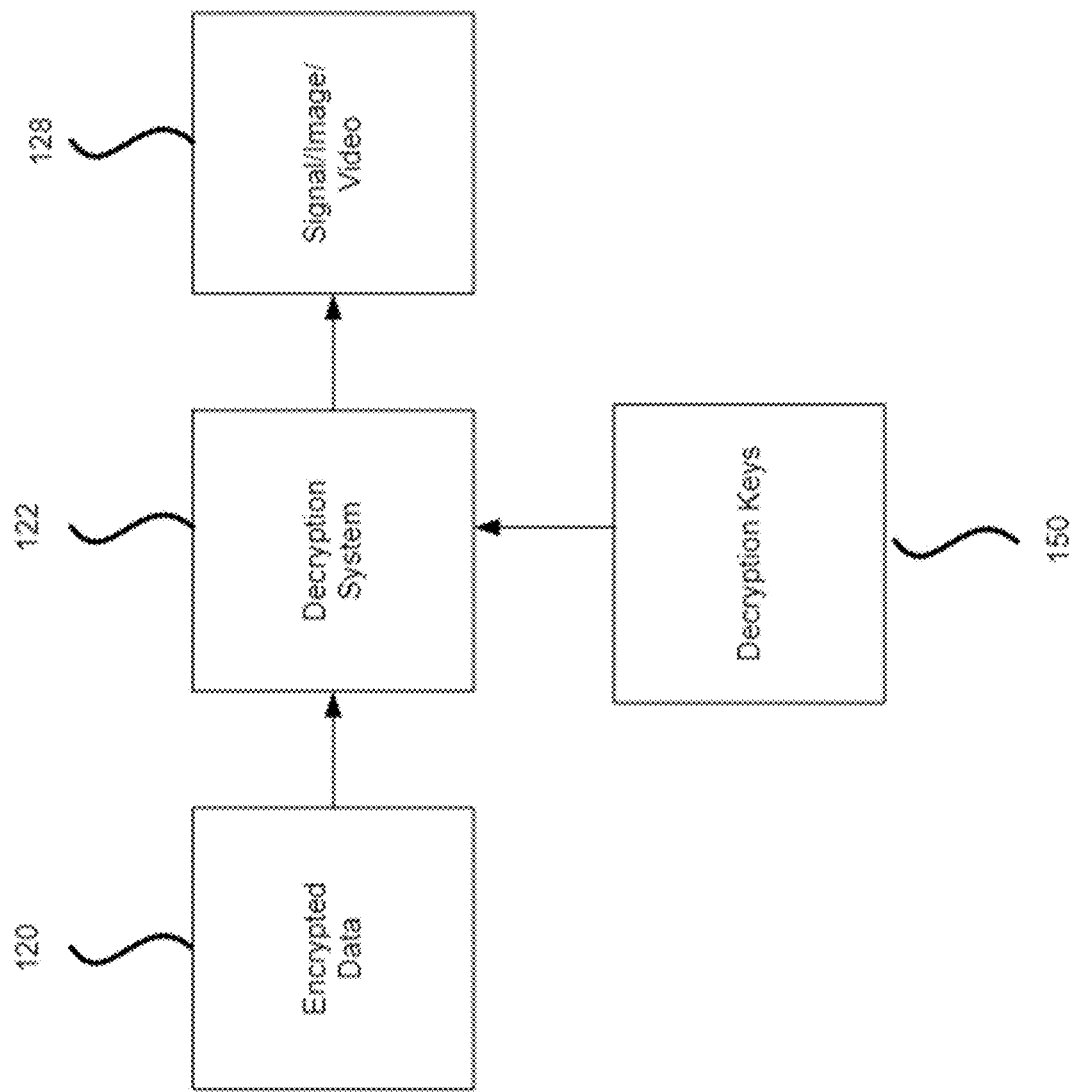
FIG. 1B shows a decryption system.

FIG. 1B shows a decryption system 122. Encrypted data 120 is input to the decryption system 122. The decryption system 122 receives decryption keys 150. The decryption system 122 outputs decrypted data 128 as a signal, such audio, image, video, and/or other signal information 128.

In some embodiments, and as shown in FIG. 1B, an embodiment of the present invention provides a decryption system 122 for improving information security of encrypted data signals. The decryption system 122 includes: a decryption unit configured to receive a plurality of encrypted data signals without phase information; deciphering, by the decryption unit, each encrypted data signal of the plurality of encrypted data signals, based on a unique key 150 that corresponds to the encrypted data signal; and performing recovery of phase of an original input signal associated with the encrypted signals in an iterative manner and including averaging the deciphered data signals.

Figure 2A:
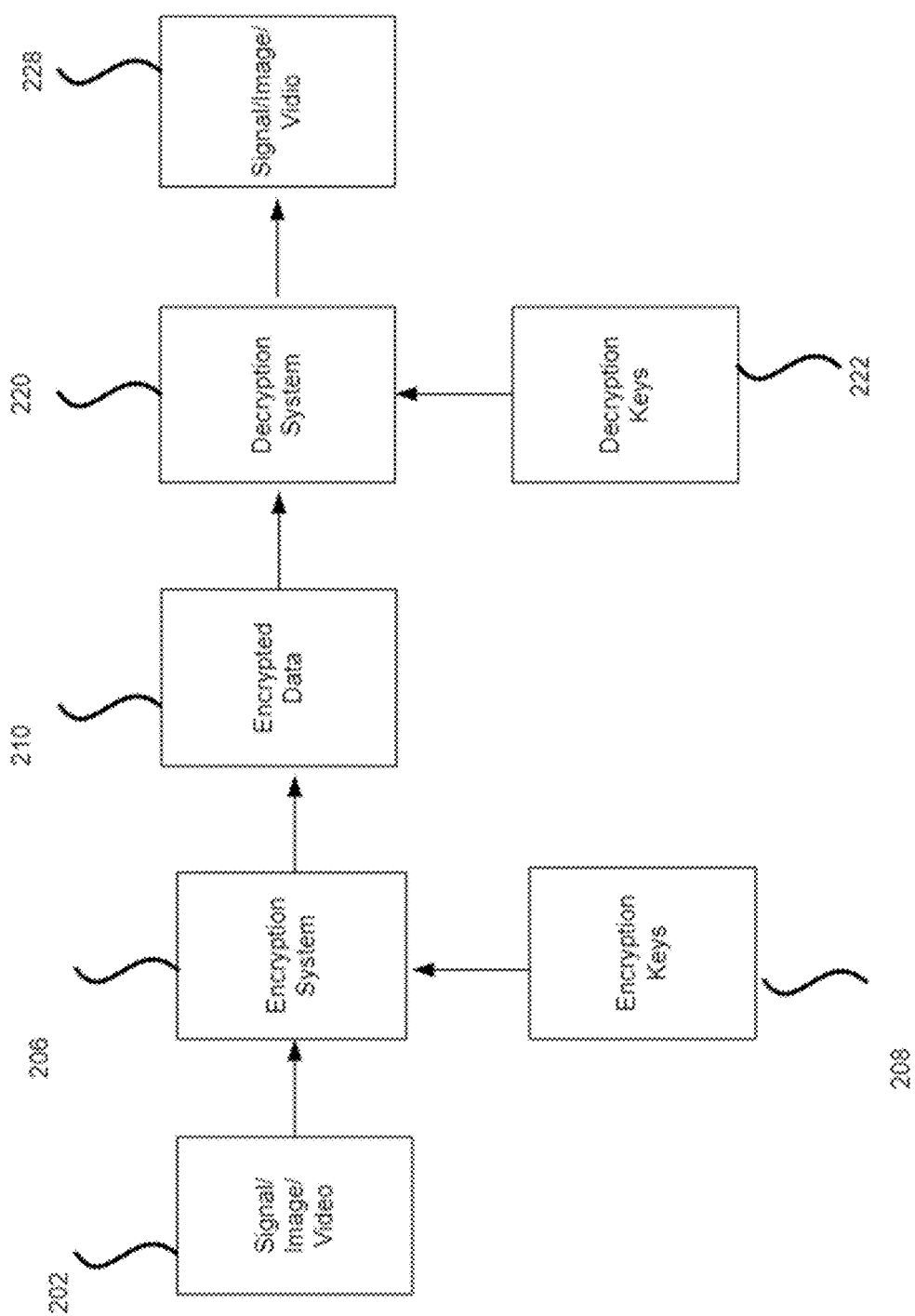
FIG. 2A shows an overall system that includes both an encryption system 206 and a decryption system 220.

FIG. 2A shows an overall system 200 that includes both an encryption system 206 and a decryption system 220. As shown in FIG. 2A, the encryption system 206 receives encryption keys 208 and an input signal 202 that may include image and/or video and generates encrypted data 210. The decryption system 220 receives the encrypted data 210 and decryption keys 222 and generates a corresponding decrypted signal 228 that may include image and/or video. In some embodiments, the encryption keys 208 are the same as the decryption keys 222.

The cryptography system with G2 can be realized in an optical and/or digital system when information is carried by waves. A visualization of the transmitter part of such a system is shown in FIG. 2B.

Figure 2B:
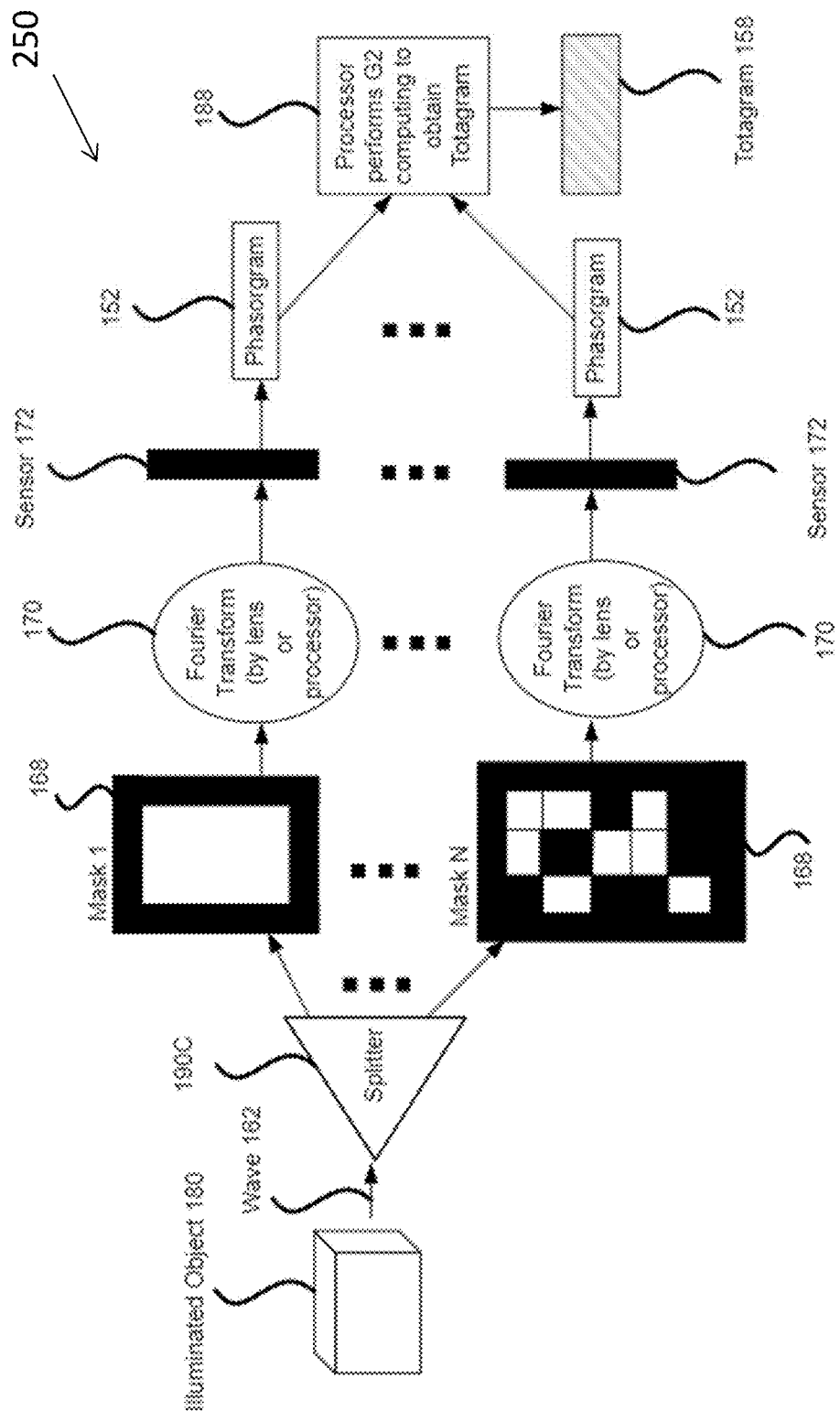
FIG. 2B shows the transmission part of the optical/digital cryptography system with G2.

FIG. 2B is a schematic view such a system 250, in accordance with the present invention. The system 250 of FIG. 2B passes an input wave 162 from an object 180 through a splitter 190C, forming separate waves that are passed through respective masks 168, and then Fourier-transformed by a transformation unit 170. The transformation unit 170 may be a processor or a lens, such as a spatial light modulator (SLM). In other words, at least part of the encrypting may be performed using a processor or a spatial light modulator (SLM).

After being Fourier-transformed, the respective components pass through sensors 172, and the resulting phasorgrams 152 are input to the processor 188, which performs G2 computing on the phasorgrams 152, thereby generating a totagram 158.

Figure 2C:
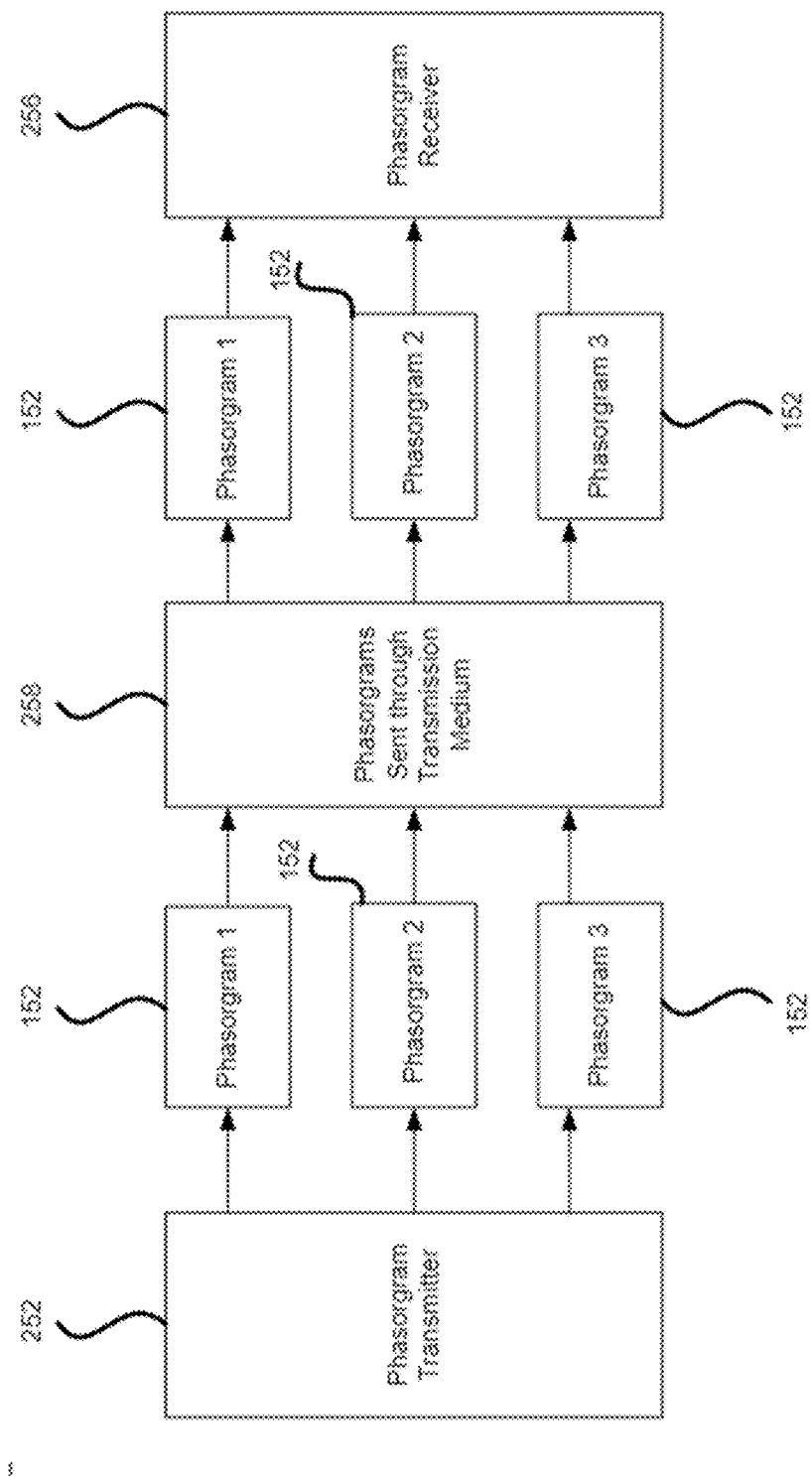
FIG. 2C is a flowchart that shows phasorgrams being sent from the transmitter to the receiver.
Figure 2D:
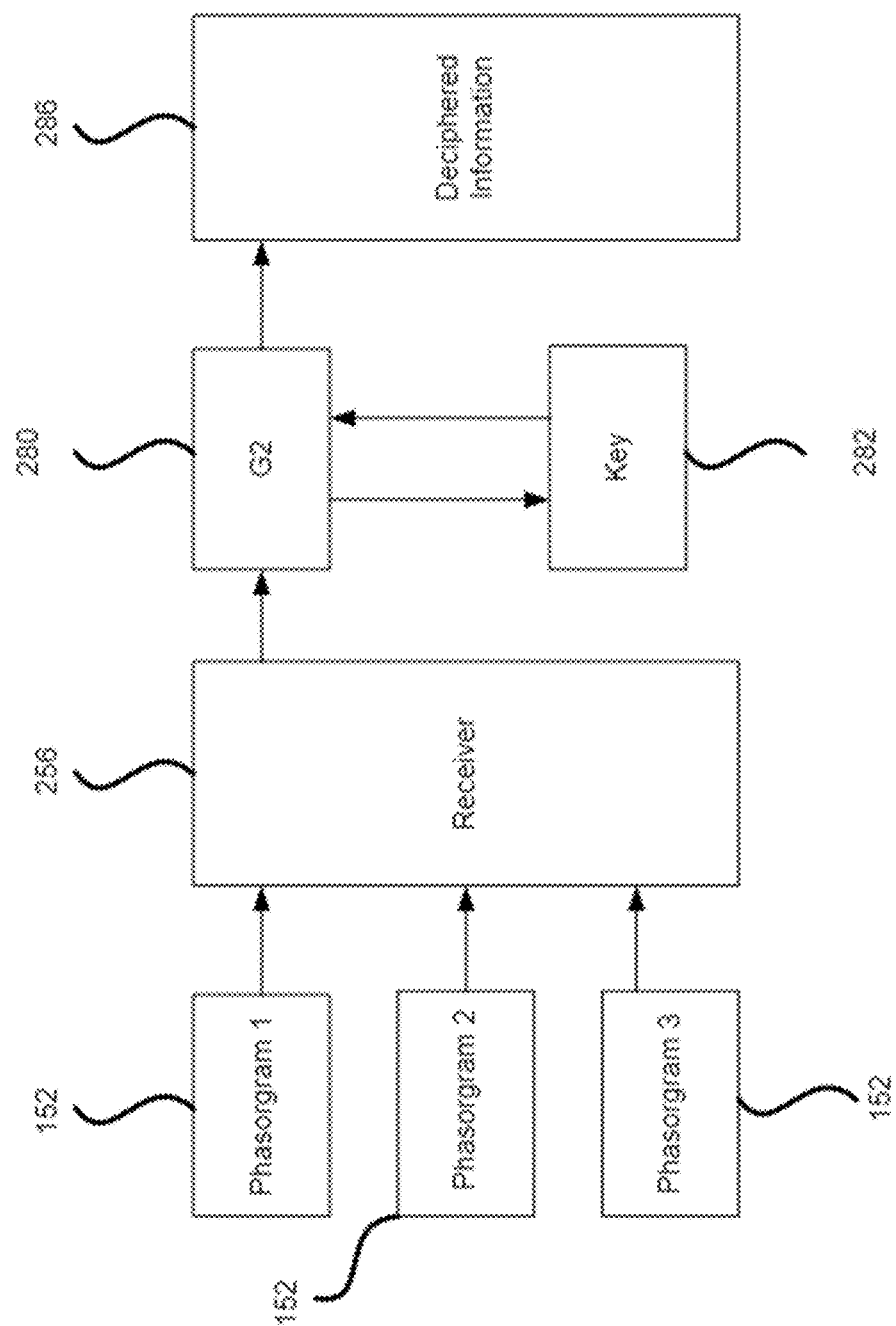
FIG. 2D is a flowchart that shows phasorgrams processed at the receiver by G2 to generate the totagram and thereby the deciphered information.

As illustrated in FIG. 2C, the end result of encryption at the transmitter 252 is the generation of phasograms 152 which are sent through a transmission medium 258 to the receiver 256. As illustrated in FIG. 2D, the phasograms 152 are processed at the receiver 256 by G2 (element 280) using the decryption keys 282 to generate the totagram 158, and thereby the deciphered information 286.

In other words, as shown in FIG. 3A, FIG. 3B, FIG. 3C-I, and FIG. 3C-II, an embodiment of the present invention provides an encryption system for improving information security of an input signal 302. The encryption system includes an encryption unit configured to encrypt the input signal 302 based on concurrent execution of a plurality of sequences (rows shown in FIG. 3A, FIG. 3B, FIG. 3C-I, and FIG. 3C-II) of transformations of the input signal 302, and for each sequence of the plurality of sequences: (i) perform a discrete Fourier transform 310, 332, 352 on the input signal; (ii) preserve 312, 332, 352 amplitude information of the input signal; and (iii) cipher 316, 330, 350 the input signal based on a unique key that corresponds to the sequence, wherein the execution of each one of the sequences produces a corresponding encrypted data signal 318, 338, 358, and recreation of the input signal requires each of the encrypted data signals and the corresponding unique key.

Figure 3A:
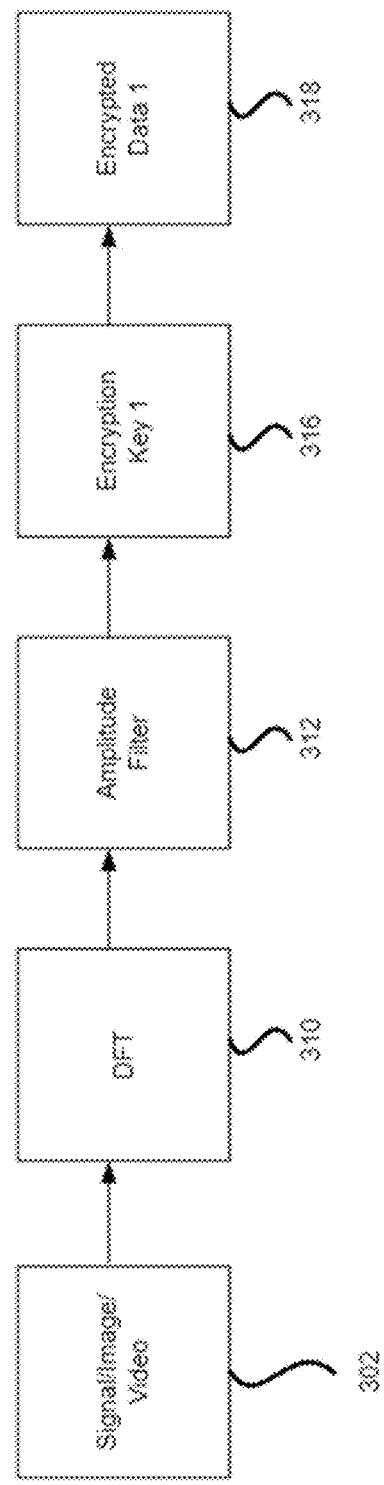

As illustrated collectively in FIG. 3A, FIG. 3B, FIG. 3C-I, and FIG. 3C-II, within a first sequence of the plurality of sequences, the discrete Fourier transform may be performed before removing the phase information. As illustrated collectively in FIG. 3A, FIG. 3C-I, and FIG. 3C-II, within the first sequence of the plurality of sequences, the ciphering may be performed after removing the phase information. As illustrated collectively in FIG. 3B, FIG. 3C-I and FIG. 3C-II, within remaining sequences of the plurality of sequences, the ciphering may be performed before the discrete Fourier transform. As illustrated collectively in FIG. 3C-I and FIG. 3C-II, within the remaining sequences of the plurality of sequences, removing the phase information may be performed after the discrete Fourier transform. As illustrated in FIG. 3C-II, the plurality of sequences may be three sequences.

FIG. 3A, FIG. 3B, FIG. 3C-I and FIG. 3C-II show flow diagrams of embodiments of encryption flow diagrams, each of which may be included in any of the systems of FIG. 1A, FIG. 1B, FIG. 2A, FIG. 2B, FIG. 2C, and FIG. 2D. FIG. 3A, FIG. 3B, FIG. 3C-I and FIG. 3C-II collectively illustrate generation of encrypted data 318, 338, 358 from an original signal 302 that may include image and/or video based on respective encryption keys 316, 330, 350, respective discrete Fourier transforms (DFT) 310, 332, 352, and respective amplitude filters 312, 336, 356. Amplitude filters 312, 336, 356 herein may remove phase information from the input signal while preserving, on the spectral plane, the amplitude information of the input signal.

Figure 3B:
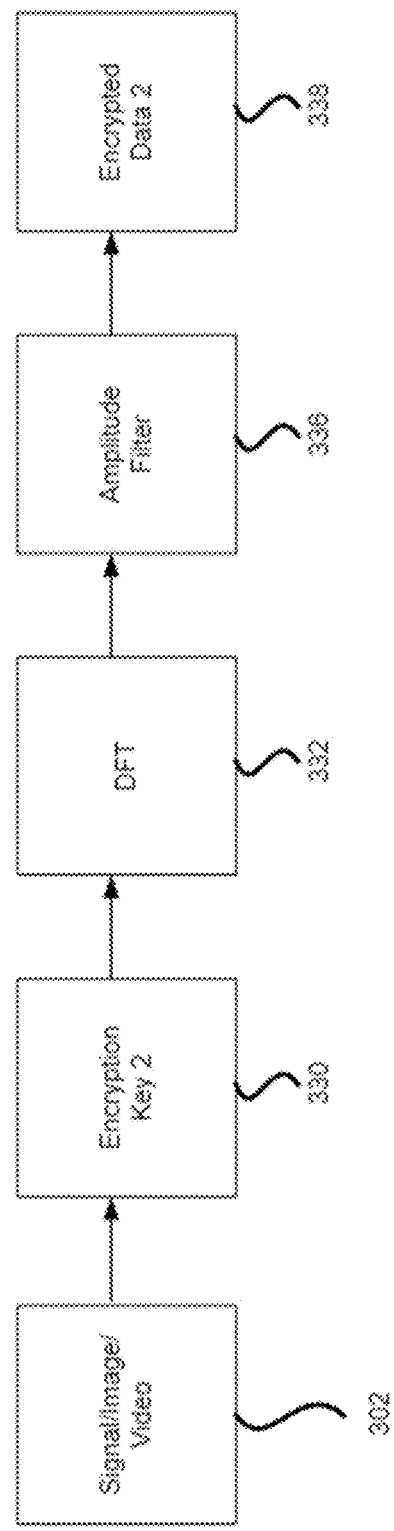

FIG. 3A illustrates generation of encrypted data 318 from a first key 316. FIG. 3B illustrates generation of encrypted data 338 from a second key 330. As the preferred embodiment, FIG. 3C-I illustrates generation of three sets of encrypted data 318, 338, 358 from an original signal 302. By contrast, FIG. 3C-II illustrates generation of two sets of encrypted data 318, 338 from an original signal 302.

With respect to FIG. 3A, FIG. 3B, FIG. 3C-I and FIG. 3C-II, 302 represents the input data.

To generate the first set of encrypted data, the discrete Fourier transform (DFT) 310 of the input data 302 is computed with the same dimensions as the input data with the fast Fourier transform (FFT) algorithm. Some embodiments zeropad (or "zero pad" herein) the data to a size which is preferably a power of 2 so that the FFT algorithm runs much faster. In other words, some embodiments may increase processing speed of the Fourier transform by zero padding the input signal.

The amplitude filters 312 preserve (e.g., keep) the amplitude of the transformed data, and discard the phase. In 316, a first encryption key is used to encrypt the transformed data amplitude, thereby generating a first encrypted data 318. The first encryption key 316 is created as a vector (1D) or a matrix (2D) with random real or complex floating point values. It is straightforward to generalize these results to higher dimensions.

The second and third sets of encrypted data are generated as follows. The input data 302 is encrypted with second and third phase encryption keys 330, 350, respectively. The discrete Fourier transform (DFT) 332, 352 of the input data 302 is computed as discussed above with respect to the first set of encrypted data. The amplitude filters 336, 356 preserve (e.g., keep) the amplitude of the transformed data, and discard the phase to generate the corresponding first and second encrypted data 338, 358, respectively.

This process can be continued, and each row in FIG. 3C can be repeated with new encryption keys. Preferably, and in all the experiments reported in Section 3, three encryption keys, as shown in FIG. 3C-II, are sufficient for recovery of information after decryption. In some embodiments, such recovery is perfect or near-perfect recovery.

The G2 method requires a minimum of two such processes. Therefore, alternatively, two encryption keys, as shown in FIG. 3C-I, may be used for recovery of information after decryption. The first process can be done with a transparent key.

The main ingredients of the G2 cryptography system are phasograms and totagram. They are described below.

A "phasogram" is defined herein as information which has little or no resemblance to the input wavefront because the phase information is discarded. Instead it is the measured or recorded spectral amplitude information after processing an input wave by Fourier transform with respect to a particular input mask. The amplitude information by itself has no meaning. Phasograms are processed by G2 to generate a "totagram".

A totagram is the reconstructed amplitude and phase of an input coherent wave with a particular wavelength. A totagram's information is an amplitude image and a phase image. The information within a totagram can be converted in to a digital (computer-generated) hologram by physical recording of recovered amplitude and phase information. The 3-D information of a totagram can also be visualized by digital techniques.

G2 is an iterative algorithm for the recovery of the phase information discarded during the encryption process [R. W. Gerchberg (2002): A new approach to phase retrieval of a wave front, Journal of Modern Optics, 49:7, 1185-1196]. [R. W. Gerchberg, System and method for recovering phase information of a wave front, U.S. Pat. No. 6,369,932 B1, Apr. 9, 2002]. [R. W. Gerchberg, System and method for recovering phase information of a wave front, U.S. Pat. No. 6,545,790 B2, Apr. 8, 2003]. [R. W. Gerchberg, Light microscope with novel digital method to achieve superresolution, U.S. Pat. No. 8,040,595 B2, Oct. 18, 2011]. The encryption/decryption keys have two functions: the first one is providing security, and the second one is making it possible for G2 to recover information perfectly. In order to explain FIG. 3C with equations, we define the following:

S=signal or image or video
F=DFT transformation
$K_i$=ith encryption key, i=1,2,3
$A_f$=amplitude filter
$s_e^i$=ith encrypted signal or image or video, i=1,2,3

Each row in FIG. 3C consists of the same operations as explained next. An encryption key $K_i$ has the same size as S. Phase keys have magnitude equal to 1, and they are referred to as phase element (hence the name phase mask). Row 1 in FIG. 3C is slightly different, to be K explained later. $K_1$ will initially be assumed to be the identity operation. For each row, the resulting signal after the encryption key is given by $$S_1^i = K_i \cdot S, i=2,3 \tag{2}$$

where the operation · is elementwise multiplication. This is followed by the DFT transformation which is given in 1-D by $$S_2^i(k) = \sum_{n=0}^{N-1} S_1^i(n) e^{-j2\pi nk/N} \quad n, k = 0, 1, 2, \ldots, (N-1) \tag{3}$$

where N is the number of data points. Eq. (3) can easily be extended to higher dimensions.

The amplitude filter yields the amplitude given by $$S_3^i(k) = A_f(S_2^i(k)) = |S_2^i(k)| \tag{4}$$

where $S_3^i(k)$ is the ith encrypted signal.

In row 1, the encryption operation depicted in 318 of FIG. 3C is done at the end after the amplitude filtering operation rather than at the beginning as in the other rows. This results in faster and correct convergence and smaller M. The new encryption key 1 after the amplitude filter in row 1 will also be denoted by $K_1$. The encrypted data 1 is now given by $$S_3^1(k) = S_3^1(k) \cdot K_1 \qquad (5)$$

where · indicates elementwise multiplication. $K_1$ preferably consists of real numbers.

Figure 4A:
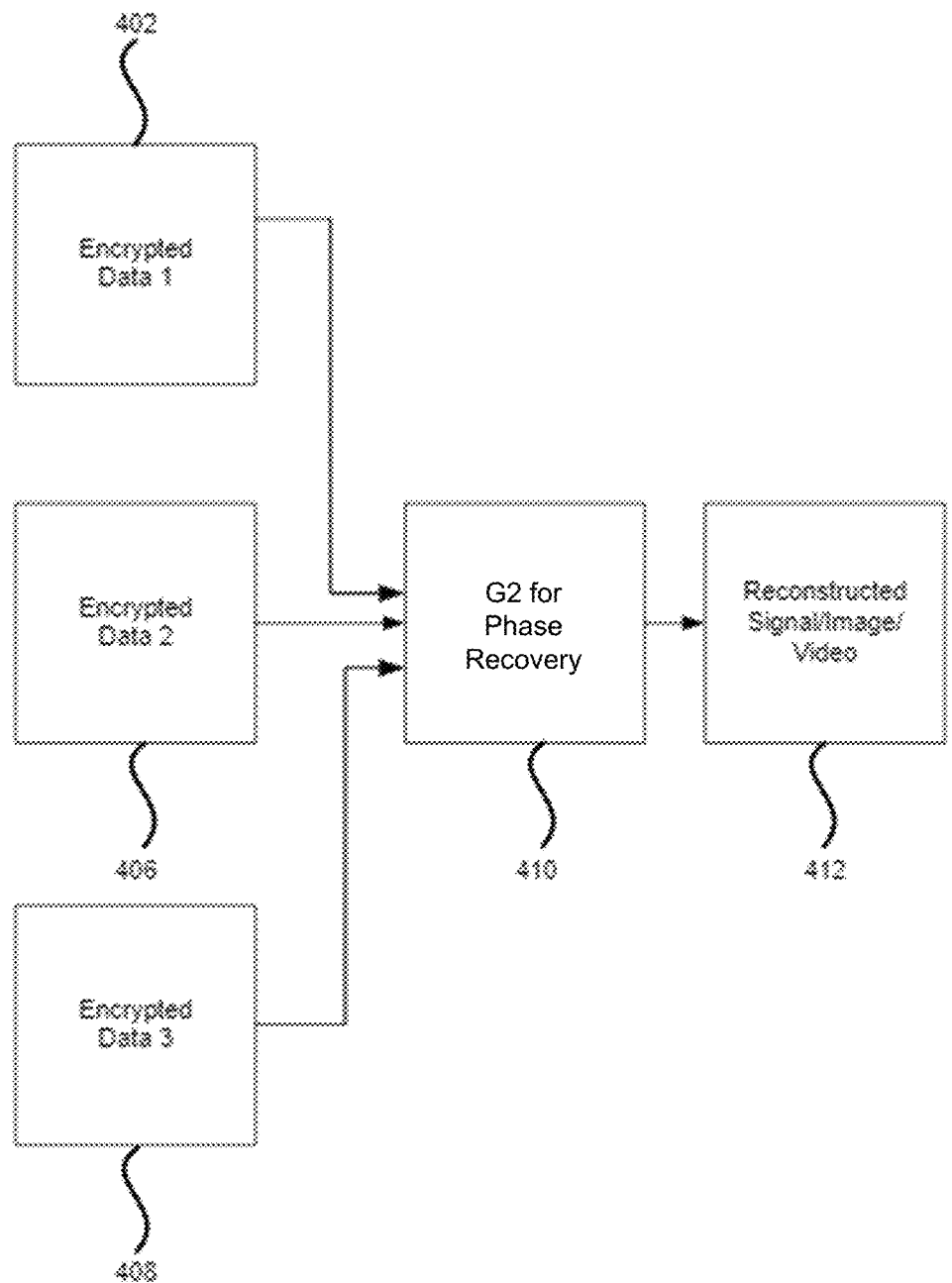
FIG. 4A and FIG. 4B show embodiments of decryption flow diagrams of decryption systems.
Figure 4B:
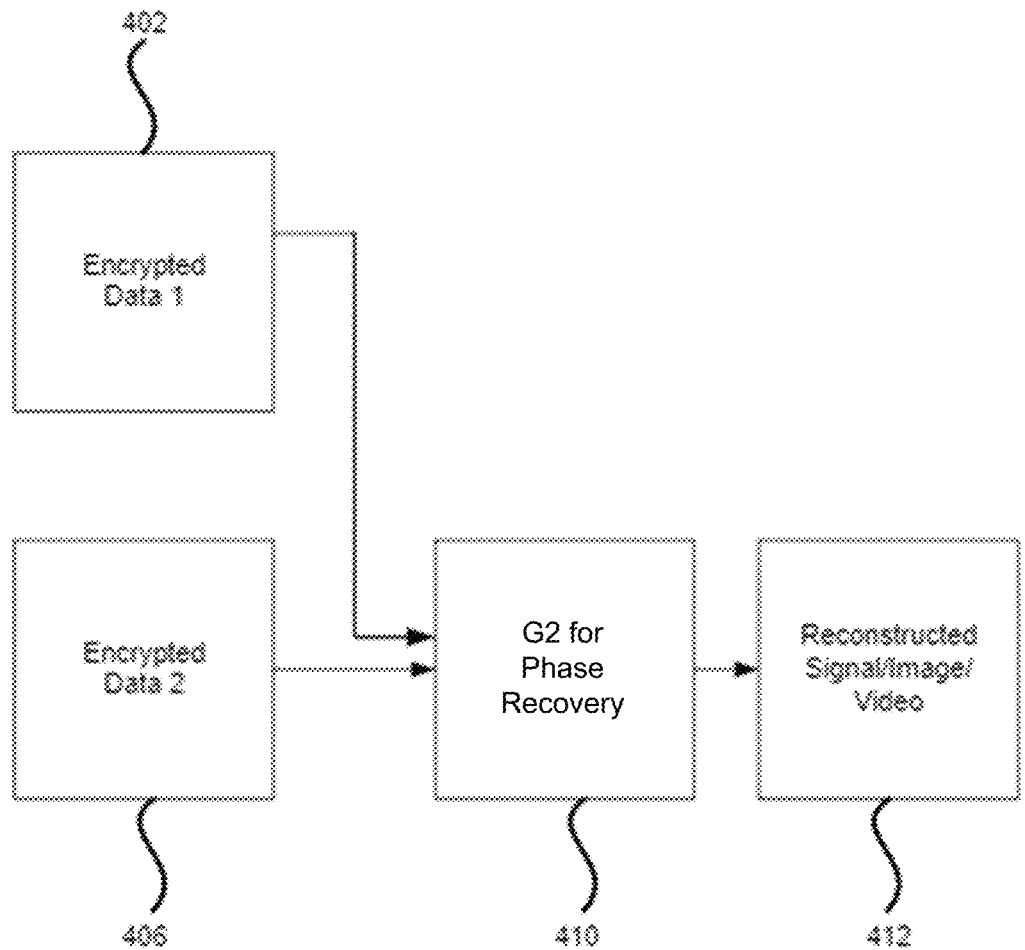

FIG. 4A and FIG. 4B show the flow diagrams of decryption systems. Encrypted data is represented by 402, 406, and 408, which correspond to the first, second, and third encrypted data (also known as "encrypted data 1, 2 and 3," herein) 318, 338, 358, respectively, of FIG. 3C-I.

Such encrypted data 318, 338, 358 carries amplitude information, given that phase is removed through the amplitude filters 312, 336, 356. As such, in FIG. 4A, the three sets of encrypted amplitude information 318, 338, 358 of FIG. 3C-I are input to G2 (element 410) which generates a reconstructed signal 412 that may include an image or video.

FIG. 4B illustrates an embodiment that corresponds to FIG. 3C-II. FIG. 4B illustrates two sets of encrypted amplitude information 402, 406 being input to G2 (element 410).

G2 (element 410) constitutes the main part of the decryption system. The initial encrypted data input to G2 has no phase information. At the output during the first iteration, phase is initialized randomly with values between 0 and 2 pi.

As shown in FIG. 4A and FIG. 4B, an embodiment of the present invention provides a decryption system for improving information security of encrypted data signals. The decryption system includes: a decryption unit configured to receive a plurality of encrypted data signals 402, 406, 408 without phase information; deciphering, by the decryption unit, each encrypted data signal of the plurality of encrypted data signals, based on a unique key that corresponds to the encrypted data signal; and performing recovery 410 of phase of an original input signal associated with the encrypted signals in an iterative manner and including averaging the deciphered data signals to generate a reconstructed signal 412 that may include an image or video. Although not shown in FIG. 4A and FIG. 4B, the deciphering may be performed by a processor or a spatial light modulator (SLM).

Figure 5A:
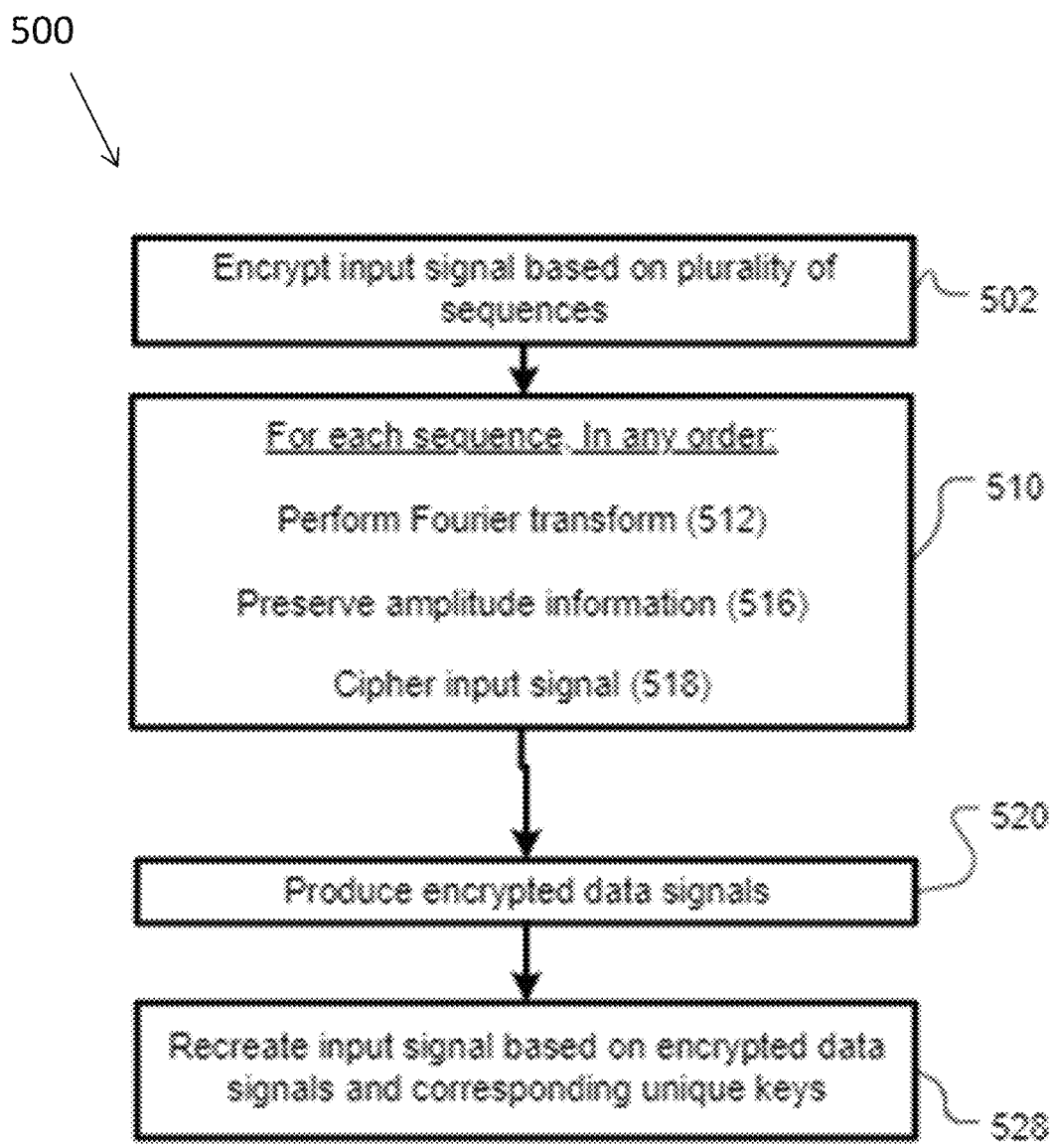
FIG. 5A shows a method of encryption.
Figure 5B:
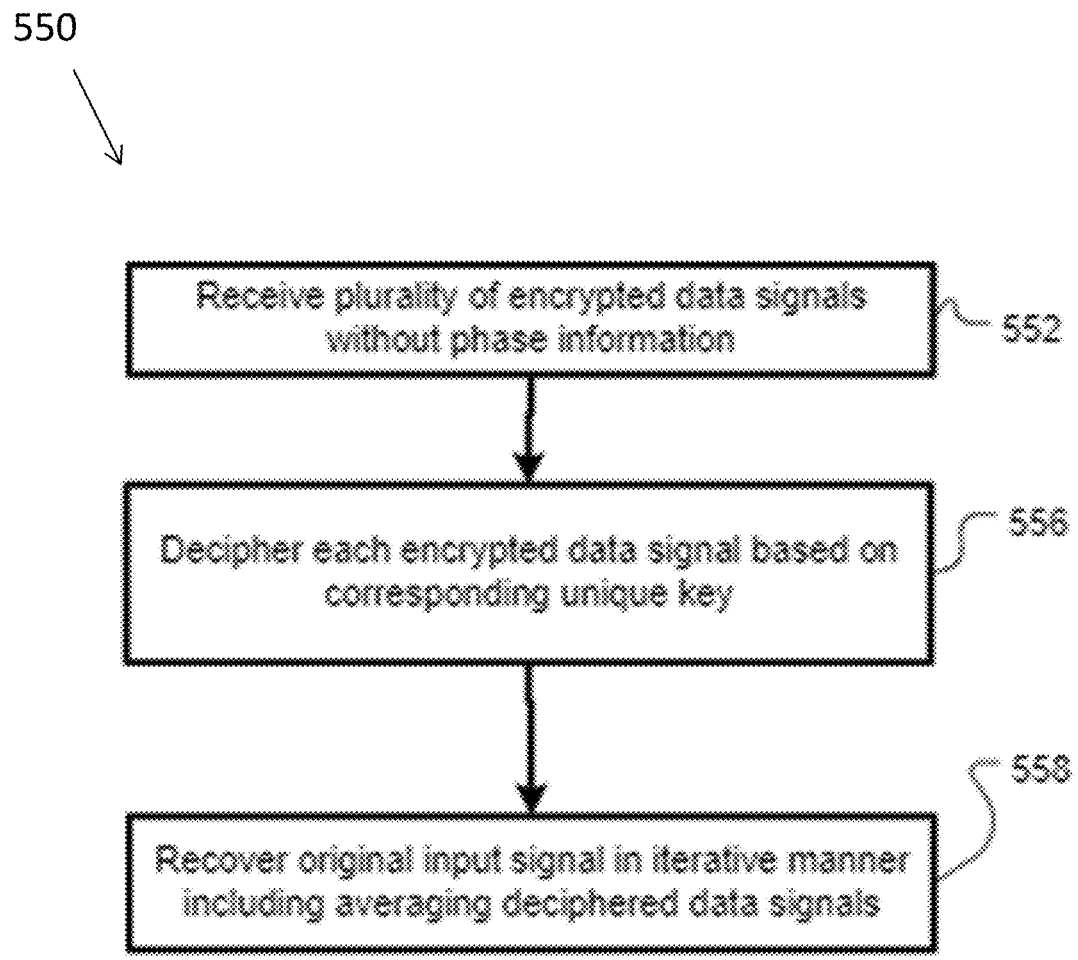
FIG. 5B shows a method of decryption.

FIG. 5A and FIG. 5B illustrate methods of encryption and decryption, respectively.

As illustrated in FIG. 5A, an embodiment of the present invention provides a method for improving information security of an input signal. The method 500 includes encrypting the input signal, based on concurrently executing a plurality of sequences of transformations of the input signal (502). The method 500 includes, for each sequence (510) of the plurality of sequences: (i) performing a discrete Fourier transform on the input signal (512); (ii) preserving amplitude information of the input signal (516); and (iii) ciphering the input signal based on a unique key that corresponds to the sequence (518). In the method 500, executing each one of the sequences produces a corresponding encrypted data signal (520). In the method 500, recreation of the input signal requires each of the encrypted data signals and the corresponding unique key (528).

As illustrated in FIG. 5B, another embodiment of the present invention provides a decryption method 550. The decryption method 550 includes receiving a plurality of encrypted data signals without phase information (552). The decryption method 550 further includes deciphering, each encrypted data signal of the plurality of encrypted data signals, based on a unique key that corresponds to the encrypted data signal (556). The decryption method 550 further includes performing recovery of phase of an original input signal associated with the encrypted signals in an iterative manner and including averaging the deciphered data signals (558).

According to some embodiments, an iterative procedure for G2 decryption is described below. As described below in the inverse DFT computation, some embodiments the G2 decryption may include deciphering each encrypted data signal based on an inverse of the unique key. Embodiments may use G2 for the iterative procedure. As such, in any embodiment, the performing recovery of the phase may include performing a discrete inverse Fourier transform on each of the deciphered data signals. In any embodiment, the performing recovery of the phase may include assigning random or pseudorandom phases to each of the deciphered data signals.

Decryption Procedure by G2

1. Initialize phase output for each encrypted data by randomly choosing a phase matrix (vector) P with elements in $[0, 2\pi]$, and modifying output data by $$S_3^i = S_3^i \cdot P \qquad (6)$$

where the operation · is elementwise multiplication.

2. Modify $S_3^1$ by $$S_3^i = S_3^i / K_1 \qquad (7)$$

3. Compute the inverse DFT (IDFT) of $S_3^i$, i=1,2,3 to obtain $$S_i = \text{IDFT}(S_3^i) \qquad (8)$$

IDFT is given by $$S_i(k) = \frac{1}{N} \sum_{n=0}^{N-1} S_3^i(n) e^{j2\pi nk/N} \quad n, k = 0, 1, 2, \ldots, (N-1) \qquad (9)$$

4. Starting with i=2, modify $S_i$ by $$S_i = S_i / K_1 \qquad (10)$$

Average $S_3^i$ by $$S = \frac{1}{3} \sum_{i=1}^{3} S_i \qquad (11)$$

6. Compute the operations given by Eqs. (2) thru (5) to generate the next set of output data.

7. Iterate steps 2 thru 6 above until convergence.

Results

The recent results with a number of input images and an audio signal will be described below. In each case, there is an original 2-D image or 1-D signal, the key images or signals to encrypt the information, followed by decryption using the decryption keys, and the reconstructed information in the form of a 2-D image or 1-D signal.

In all cases discussed in this section, the encryption of the image or signal uses three mask image or signal keys. The first one is a transparent mask, meaning it does not modify the input signal/image. The others are phase masks. When the transparent mask is used at the input, there is an amplitude/phase key at the output before the generation of the spectral decrypted signal/image. We will discuss the results below with input images and one sound signal.

Figure 6A:
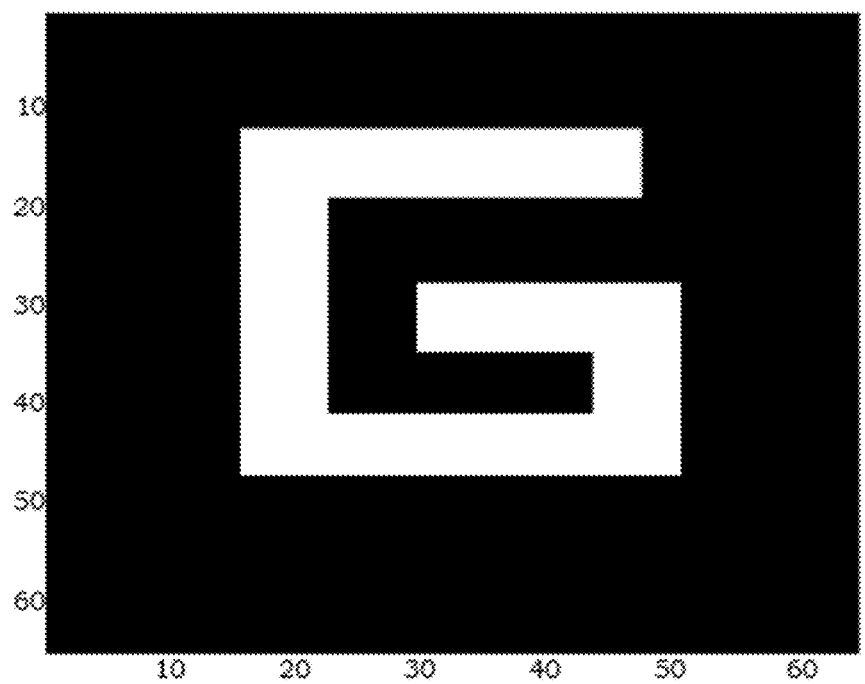
FIG. 6A shows the image of Letter G.
Figure 6B:
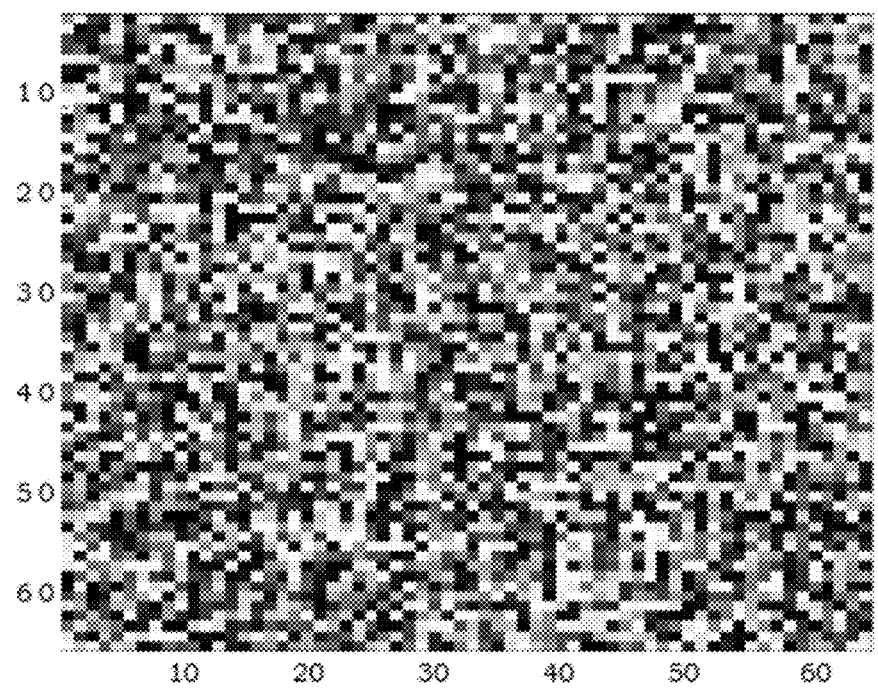
FIG. 6B shows one of the three image encryption keys.
Figure 7:
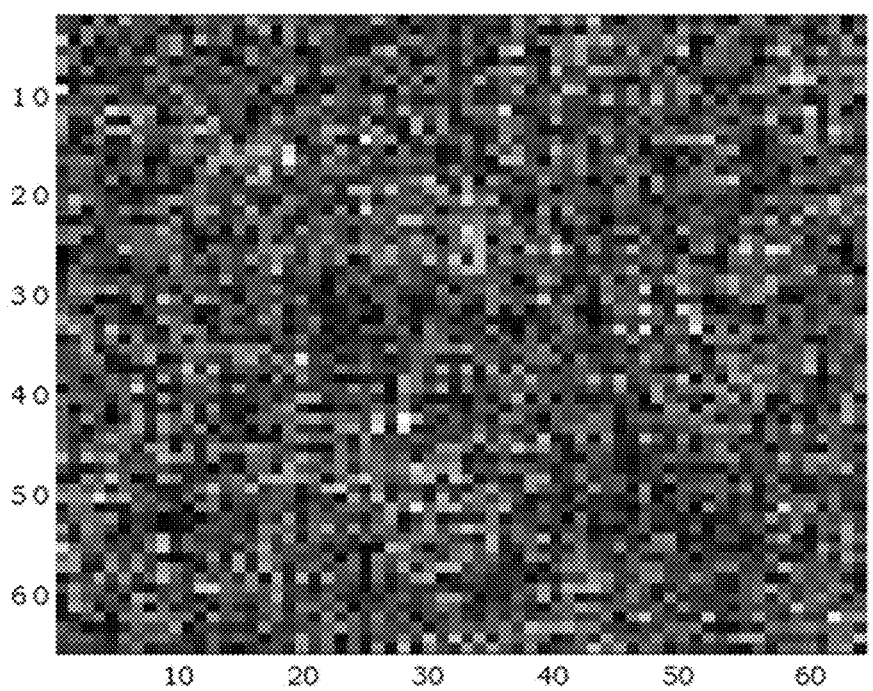
FIG. 7 shows one of three encrypted images of Letter G. Decryption of the information is carried out with the image decryption keys.
Figure 8:
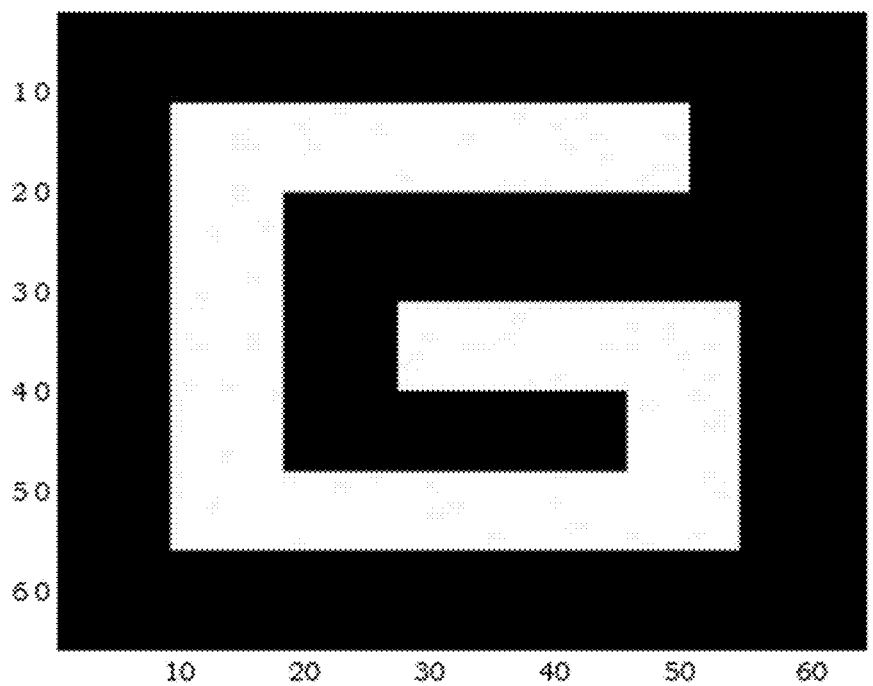
FIG. 8 shows the decrypted image of Letter G.
Figure 9:
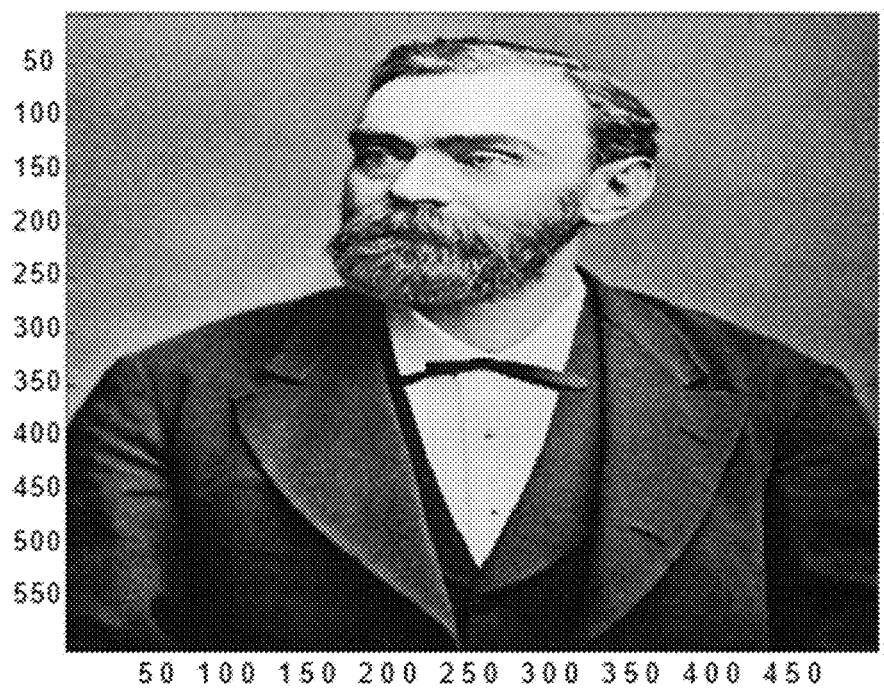
FIG. 9 shows the image of Alfred Noble.
Figure 10:
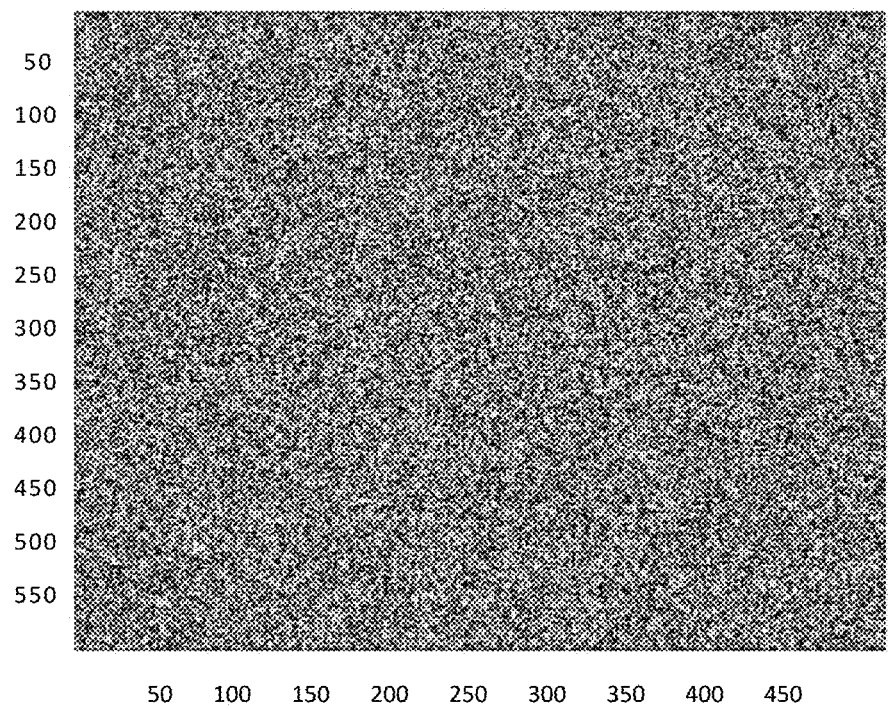
FIG. 10 shows one of the three image encryption keys.
Figure 11:
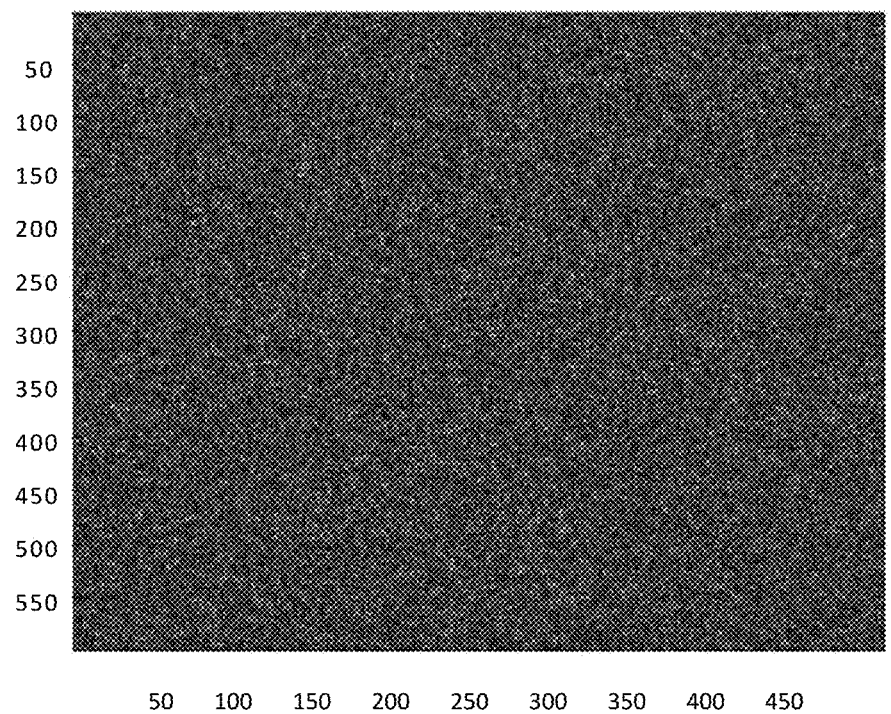
FIG. 11 shows one of three encrypted images of Alfred Noble. Decryption of the information is carried out with the image decryption keys.
Figure 12:
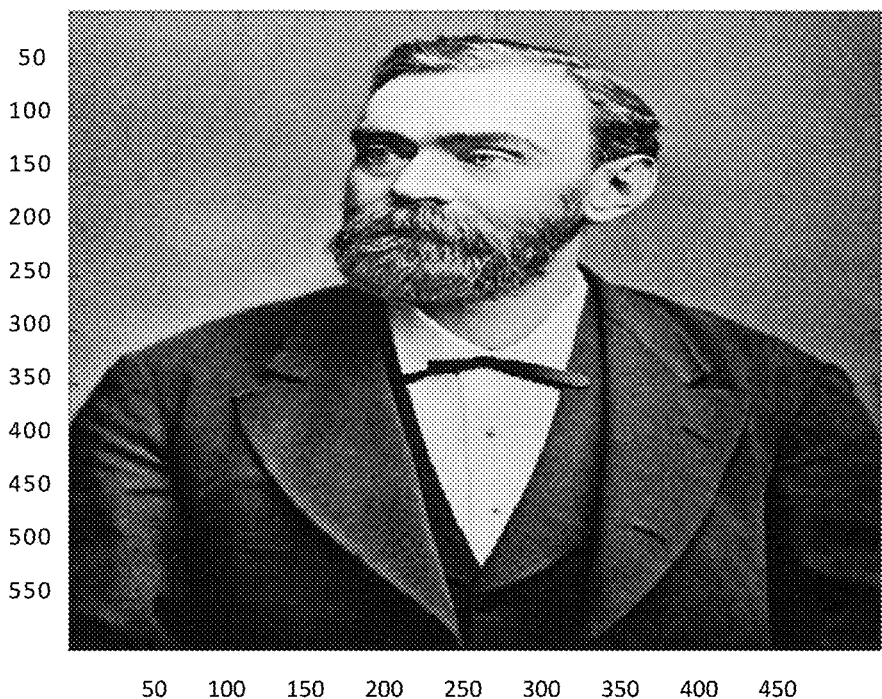
FIG. 12 shows the decrypted image of Alfred Noble.
Figure 13:
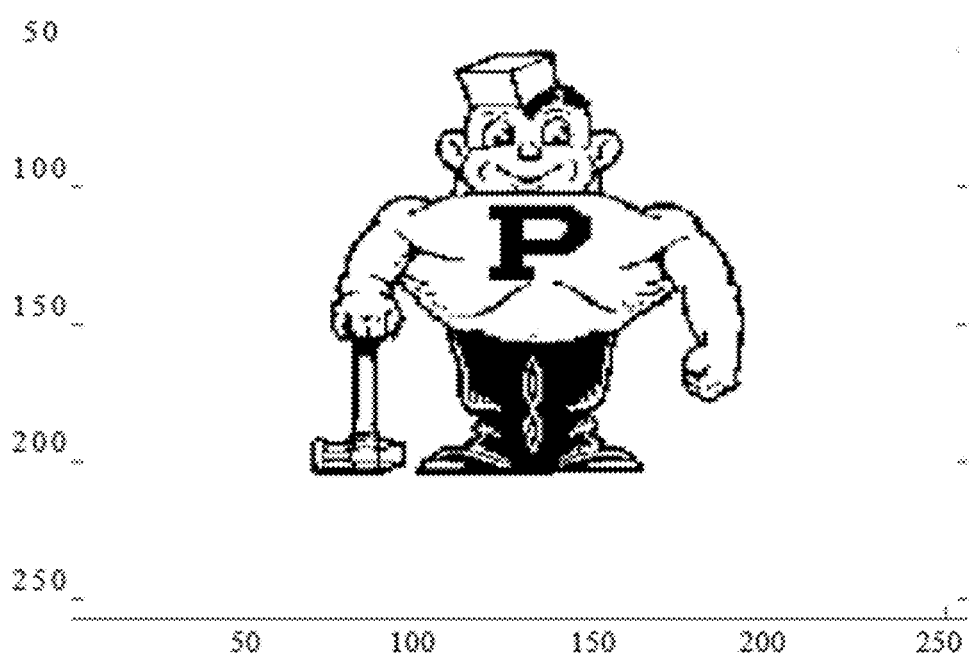
FIG. 13 shows the image of Purdue Pete.
Figure 14:
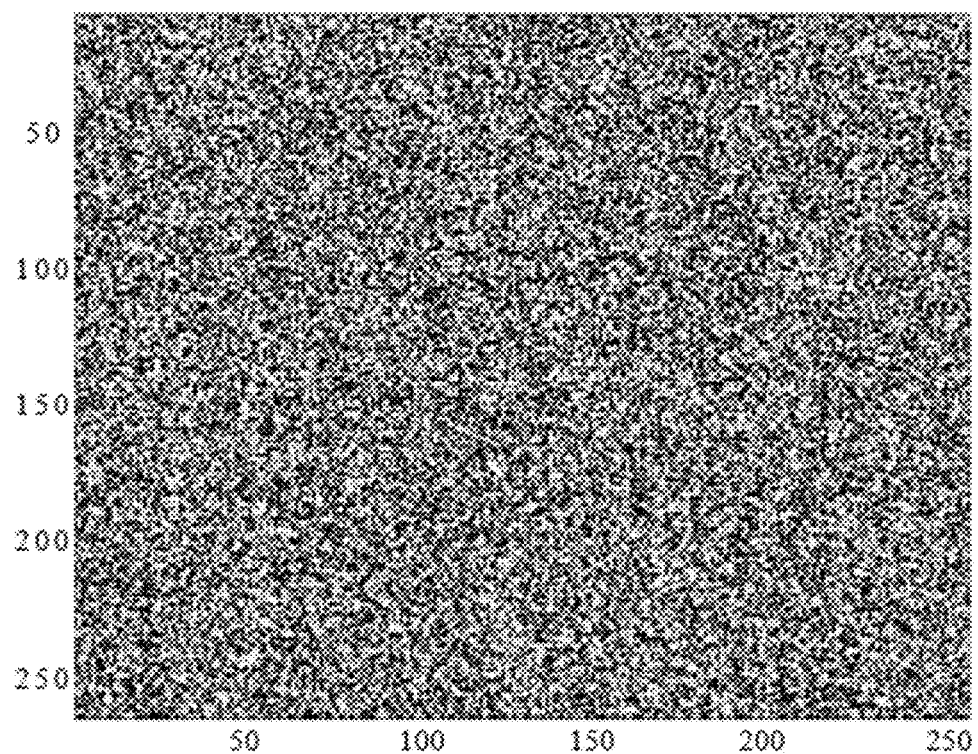
FIG. 14 shows one of the three image encryption keys.
Figure 15:
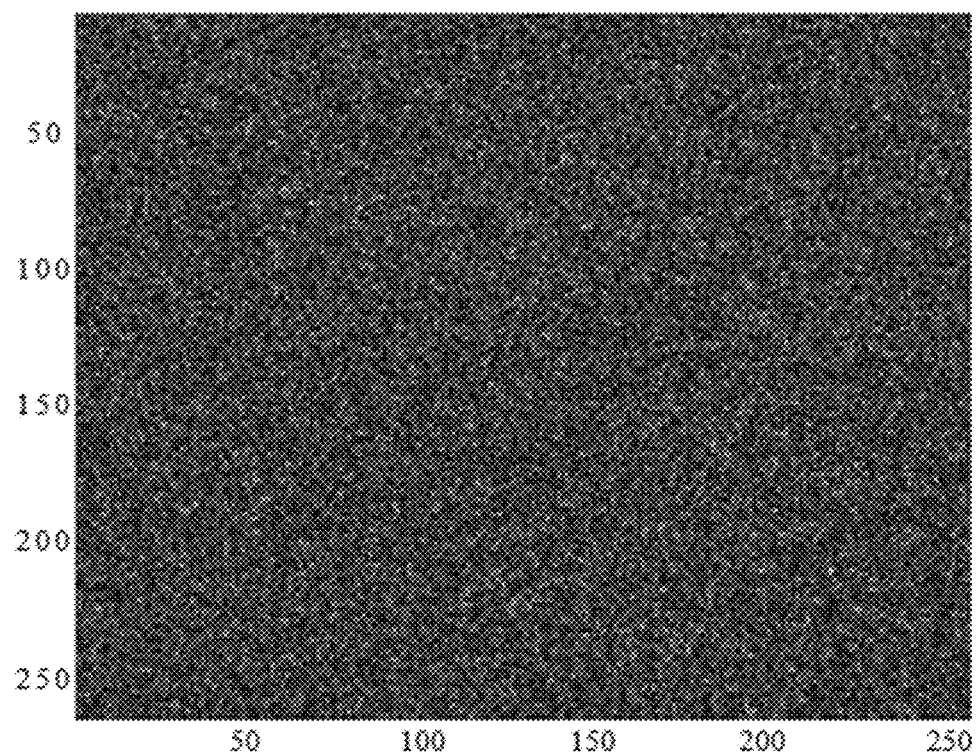
FIG. 15 shows one of three encrypted images of Purdue Pete. Decryption of the information is carried out with the image decryption keys.
Figure 16:
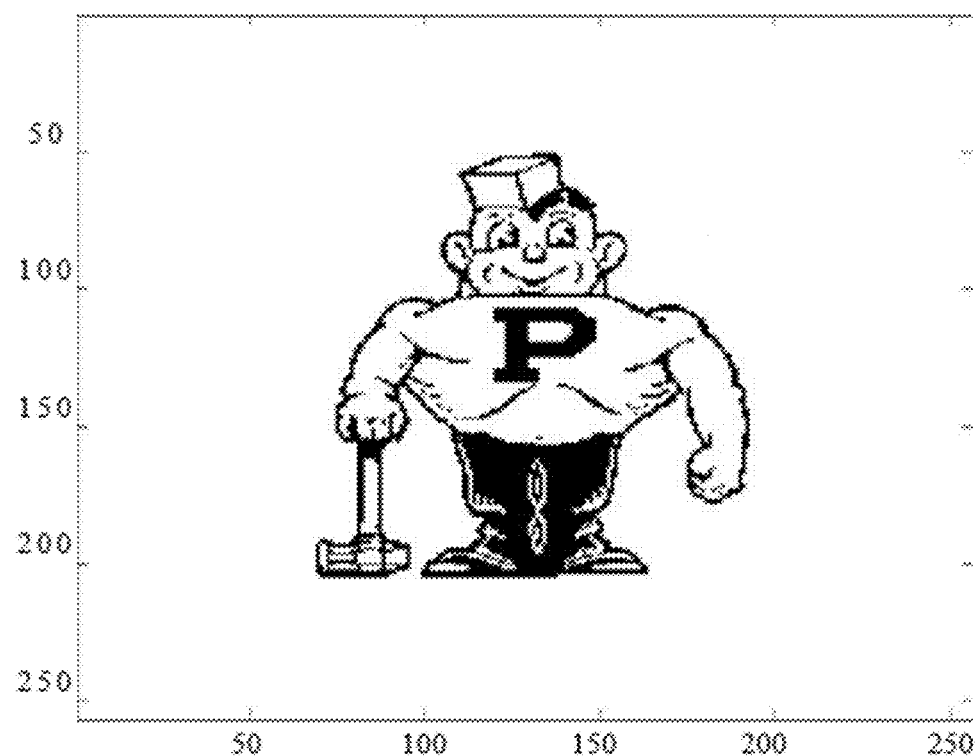
FIG. 16 shows the decrypted image of Purdue Pete.
Figure 17:
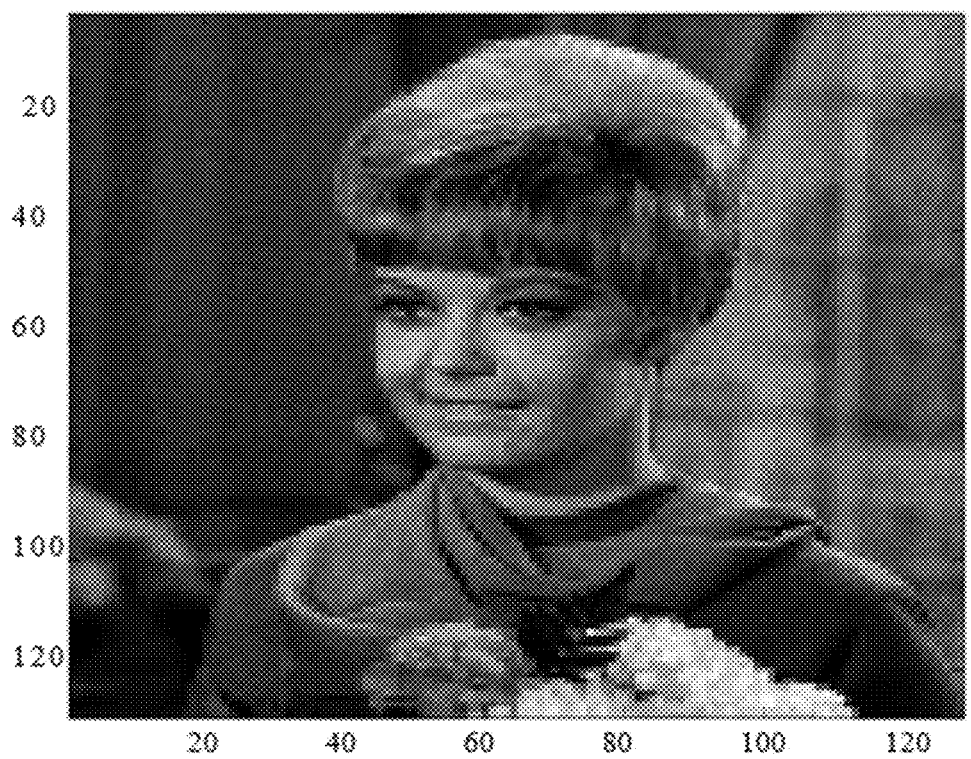
FIG. 17 shows the image of Girl.
Figure 18:
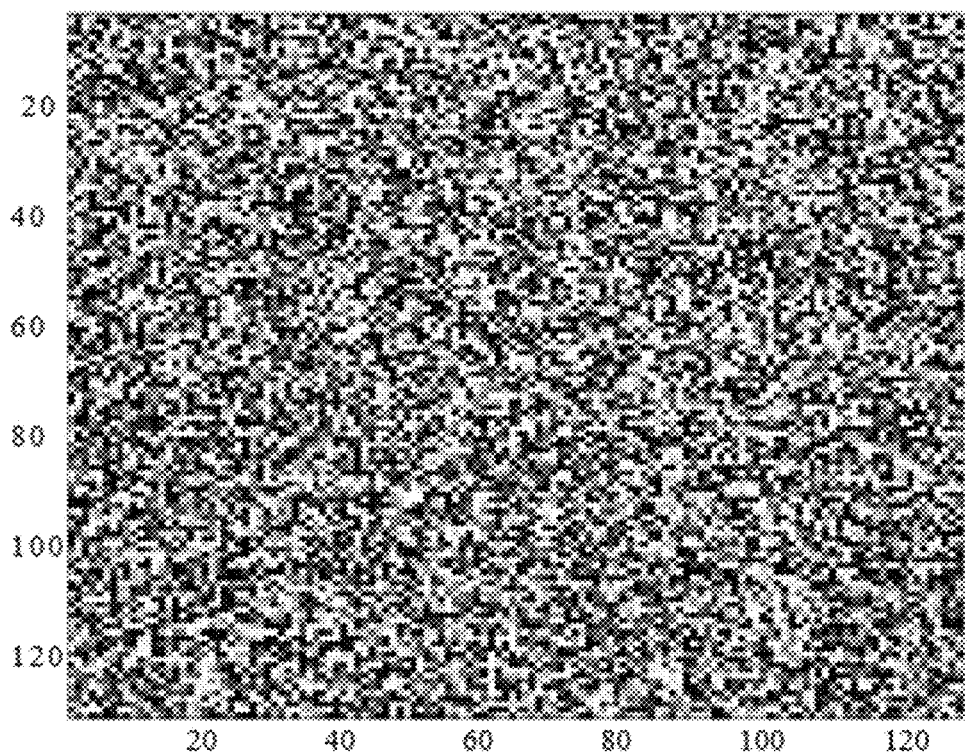
FIG. 18 shows one of the three image encryption keys.
Figure 19:
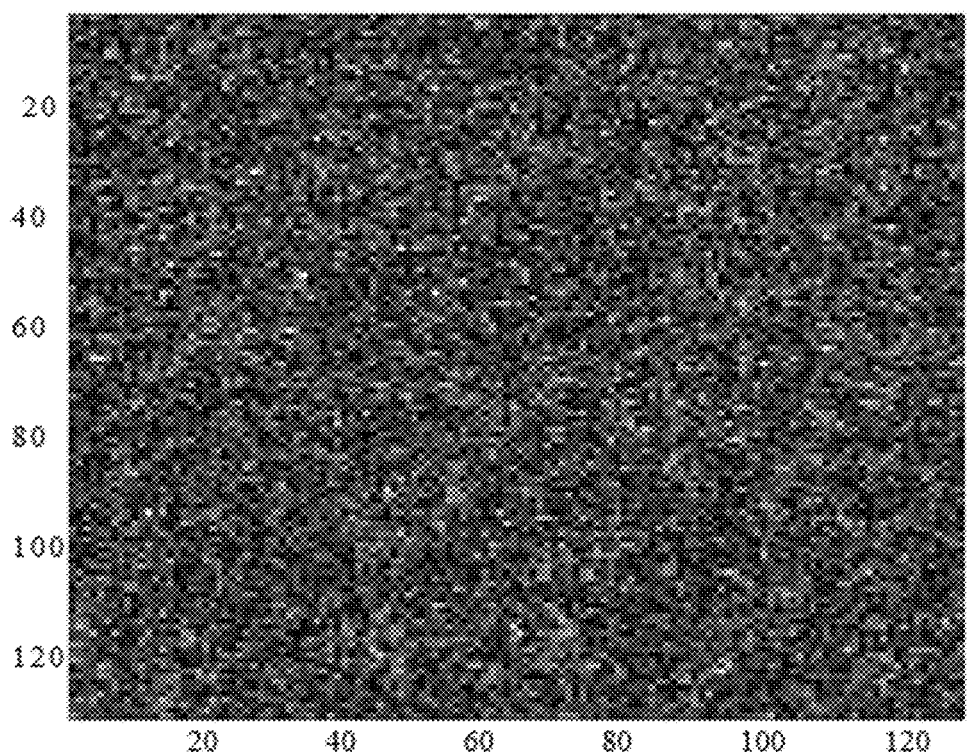
FIG. 19 shows one of three encrypted images of Girl. Decryption of the information is carried out with the image decryption keys.
Figure 20:
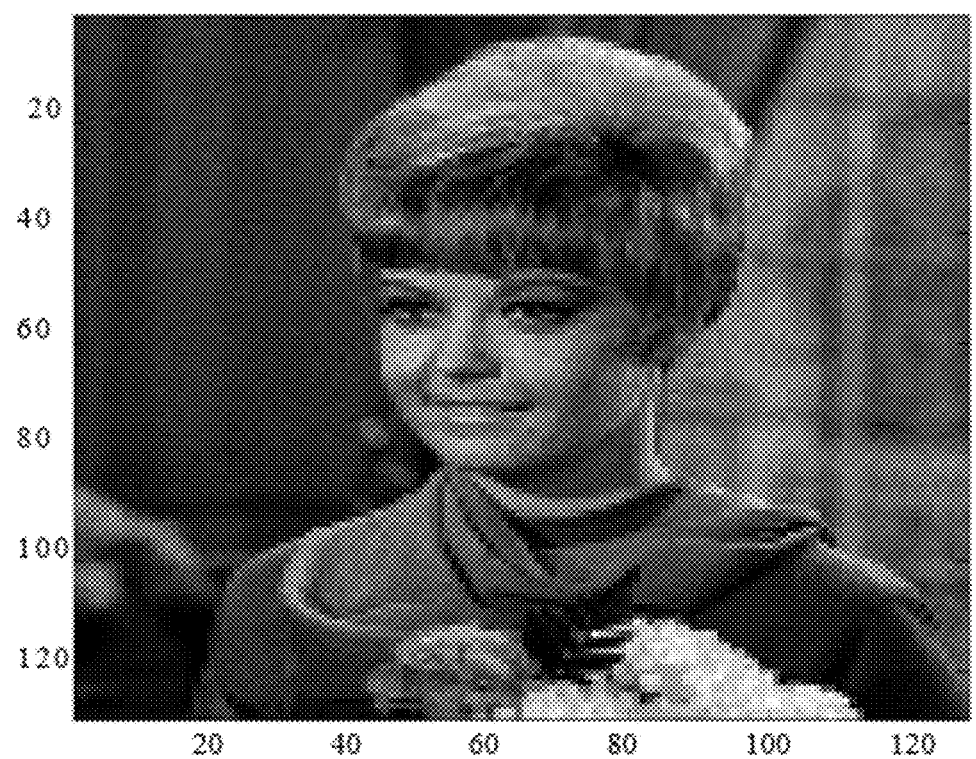
FIG. 20 shows the decrypted image of Girl.
Figure 21:
FIG. 21 shows the image of Lena.
Figure 22:
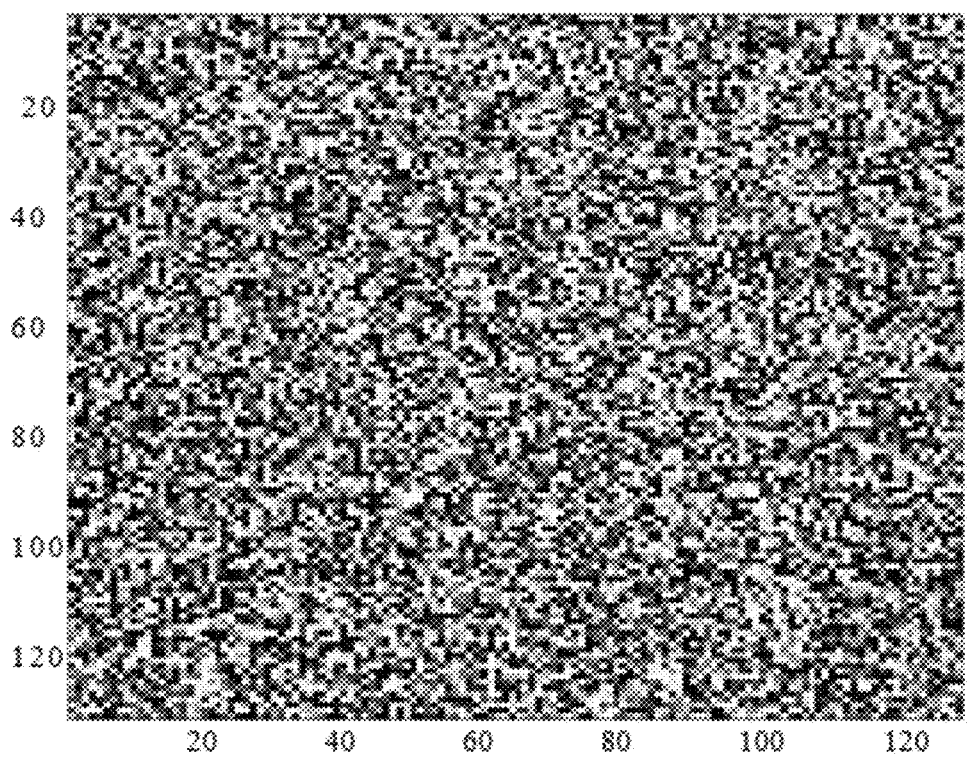
FIG. 22 shows one of the three image encryption keys.
Figure 23:
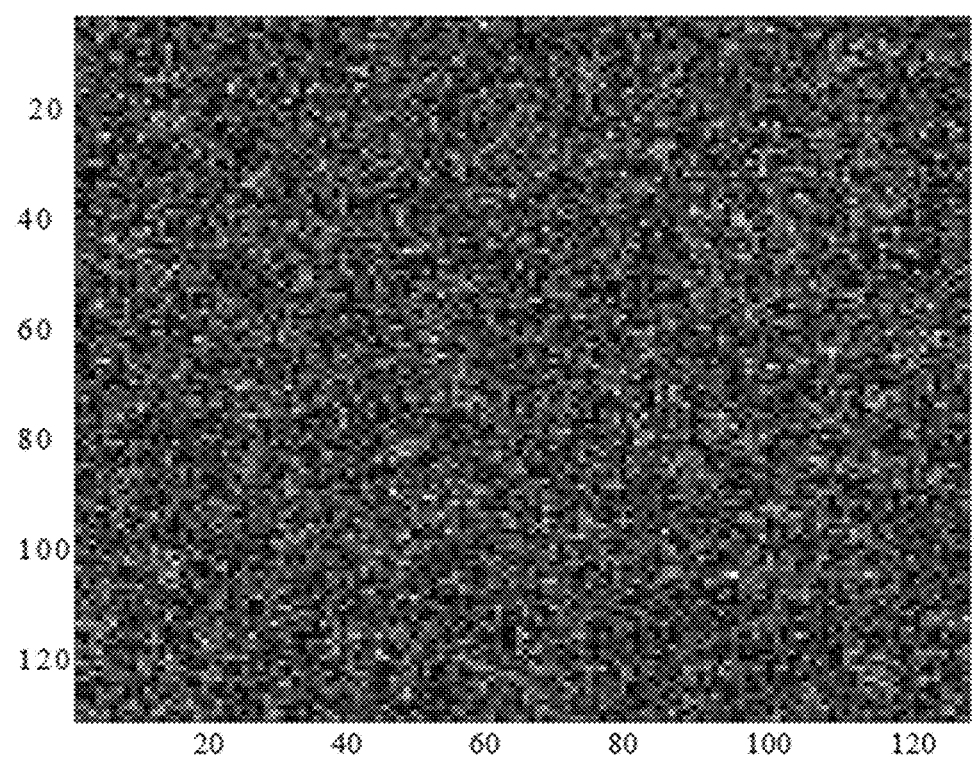
FIG. 23 shows one of three encrypted images of Lena. Decryption of the information is carried out with the image decryption keys.
Figure 24:
FIG. 24 shows the decrypted image of Lena.
Figure 25:
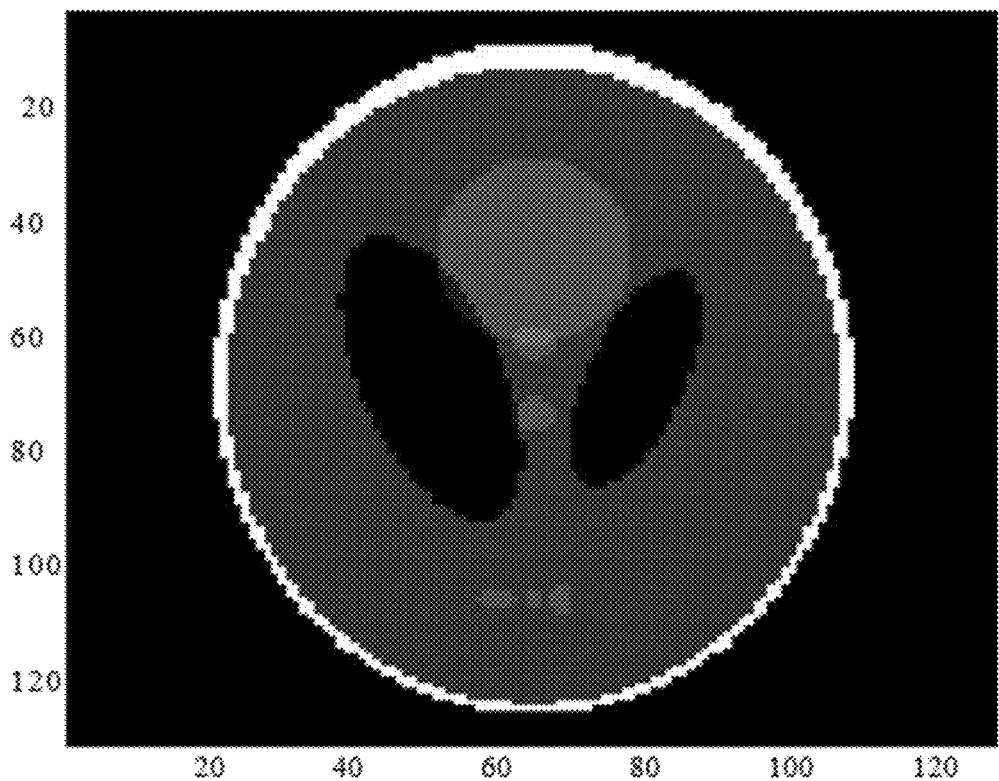
FIG. 25 shows the image of Phantom.
Figure 26:
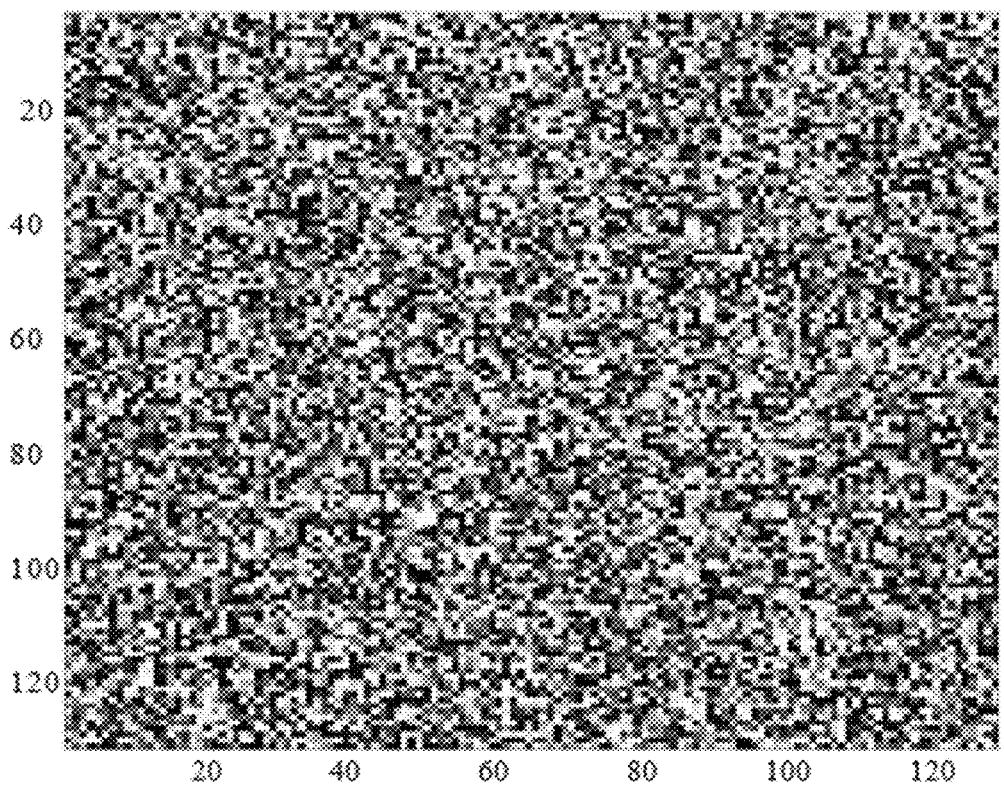
FIG. 26 shows one of the three image encryption keys.
Figure 27:
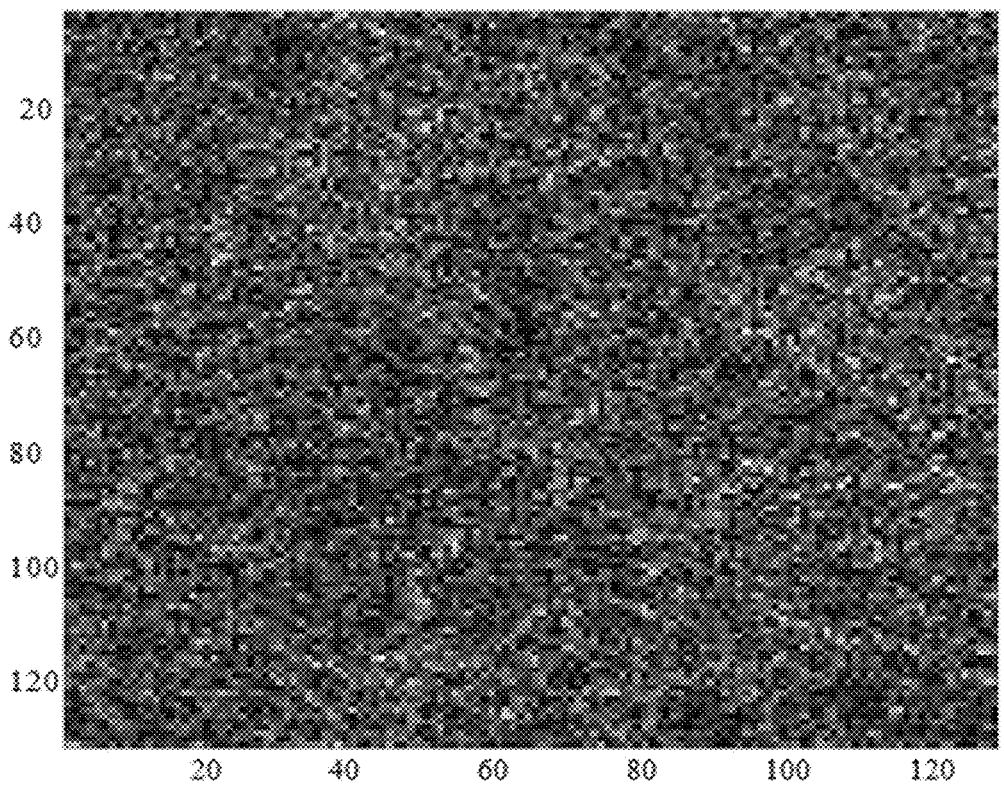
FIG. 27 shows one of three encrypted images of Phantom. Decryption of the information is carried out with the image keys.
Figure 28:
FIG. 28 shows the decrypted image of Phantom.
Figure 29:
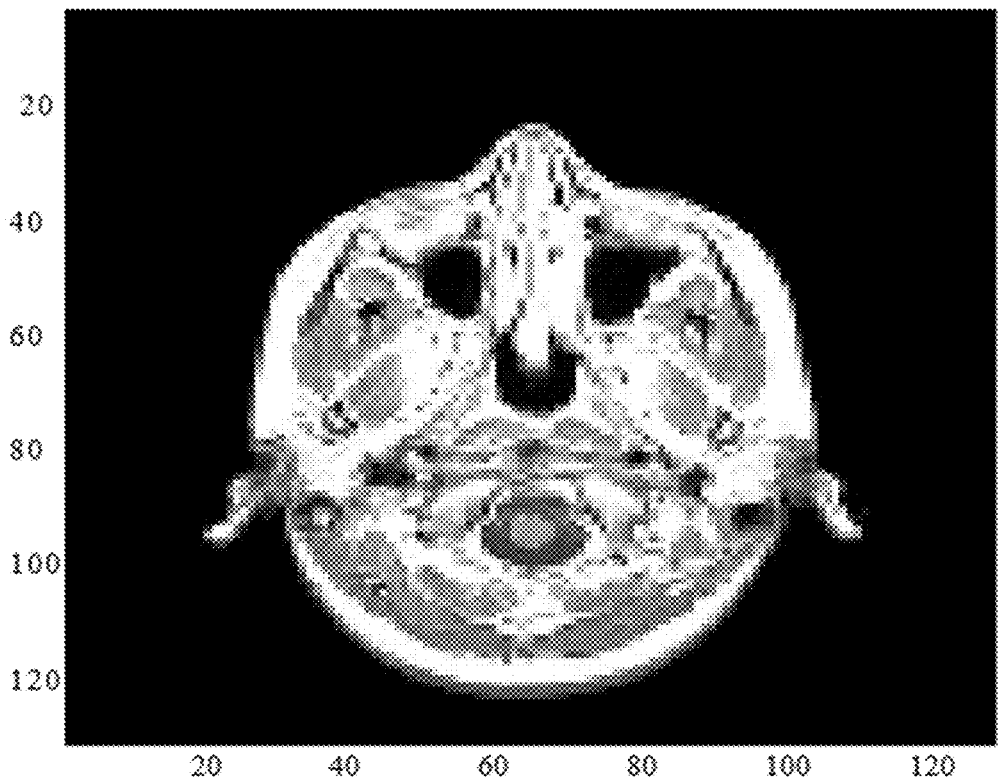
FIG. 29 shows the MRI image.
Figure 30:
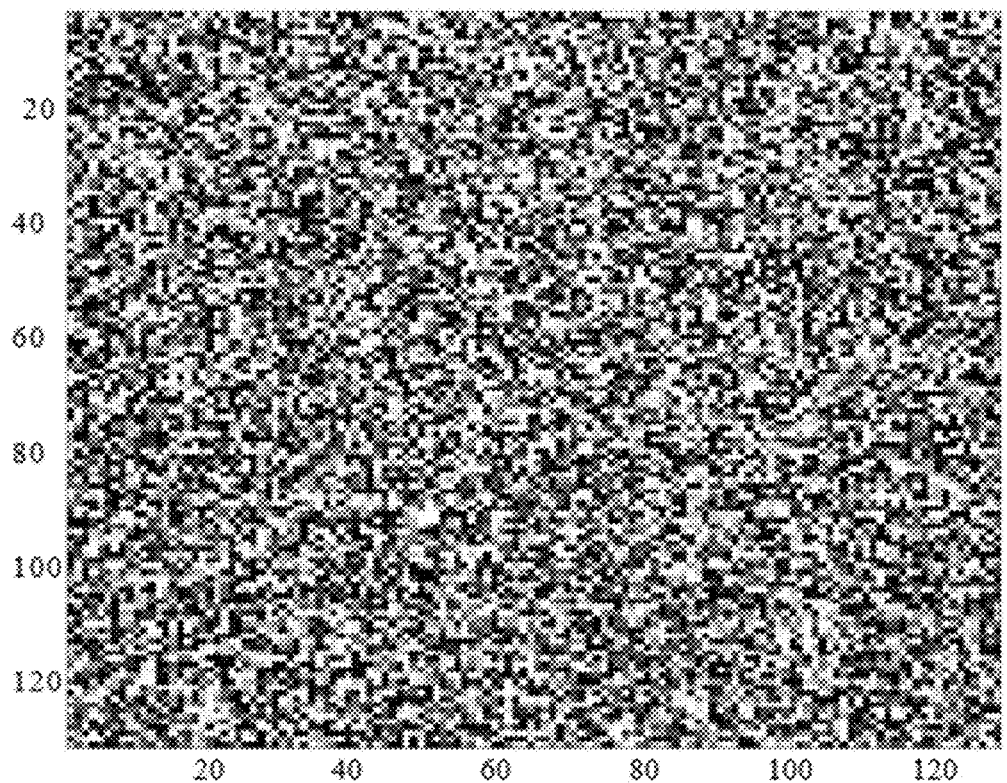
FIG. 30 shows one of the three image encryption keys.
Figure 31:
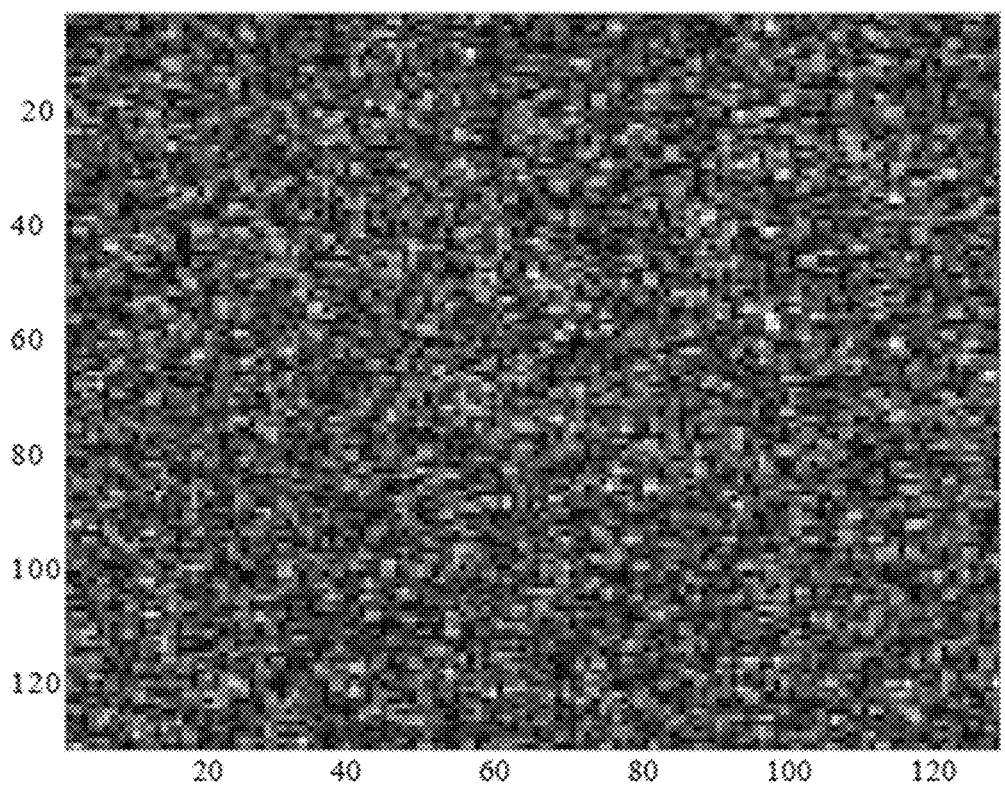
FIG. 31 shows one of three encrypted MRI images. Decryption of the information is carried out with the decryption image keys.
Figure 32:
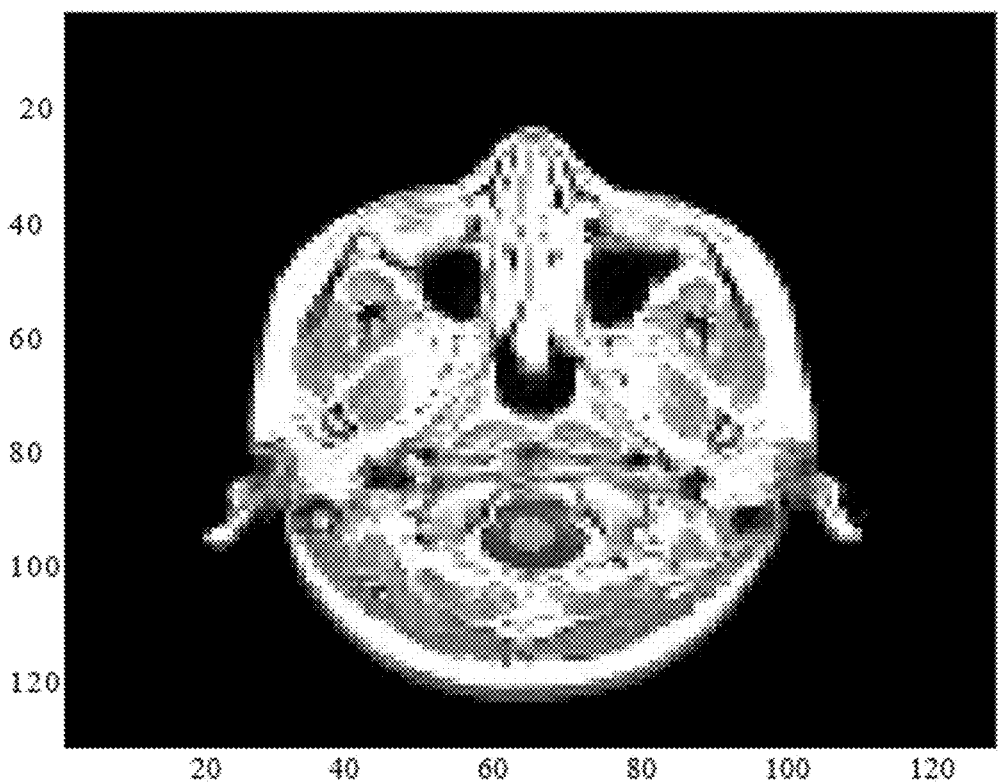
FIG. 32 shows the decrypted MRI image.
Figure 33:
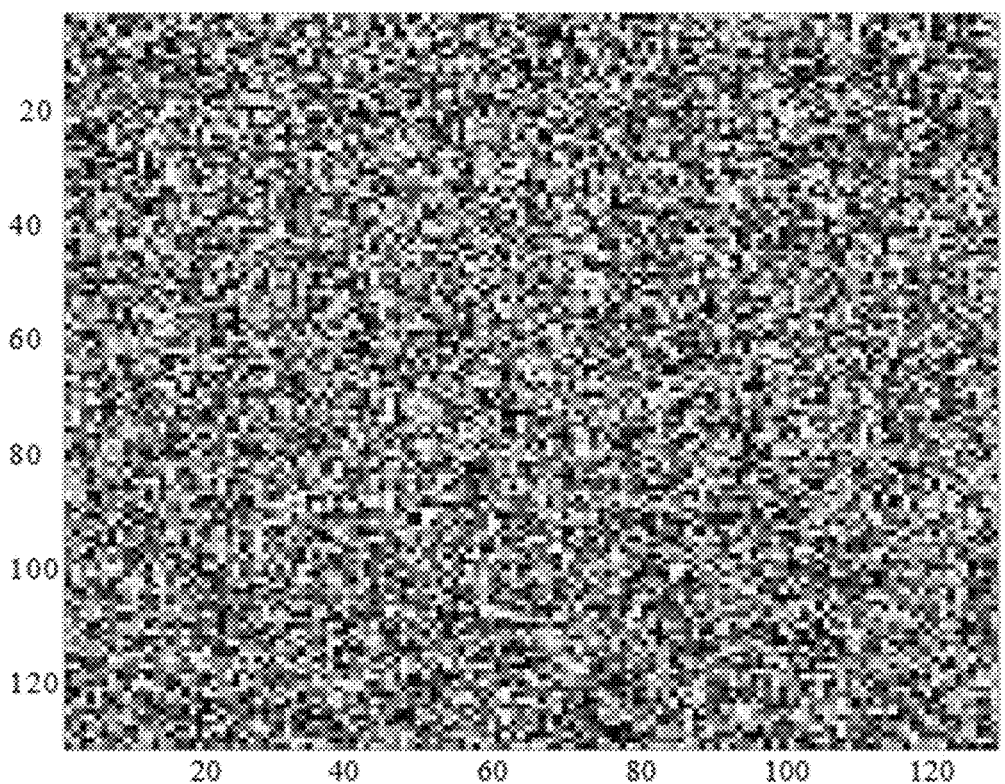
FIG. 33 shows a random binary image.
Figure 34:
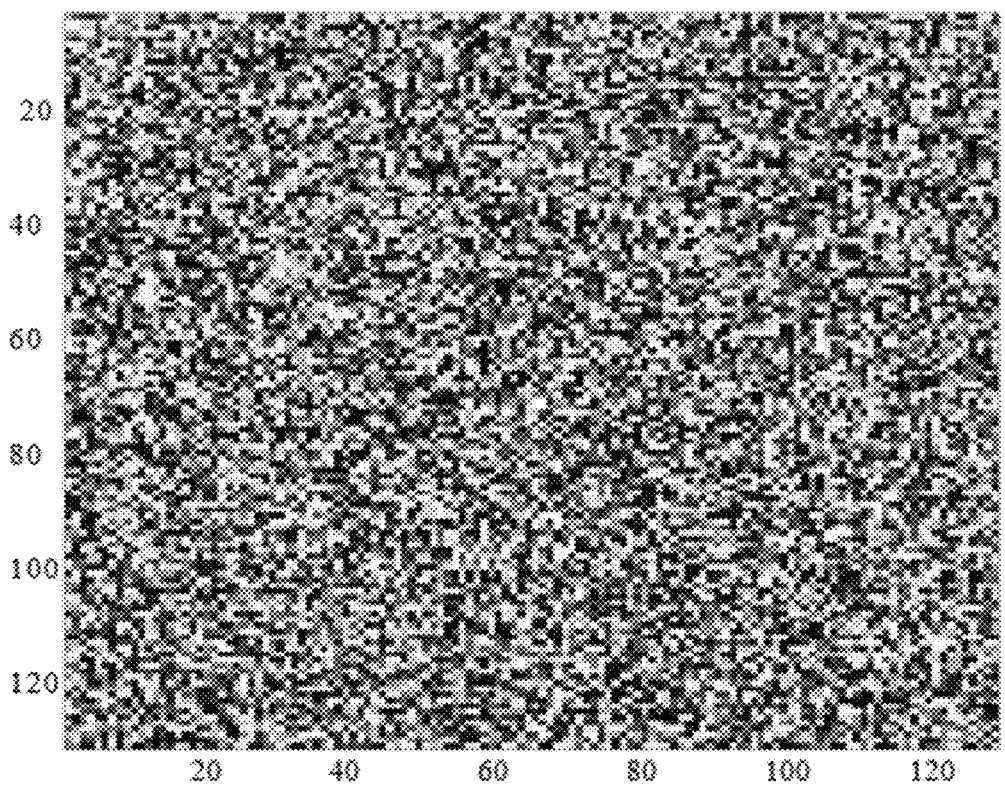
FIG. 34 shows one of the three image encryption keys.
Figure 35:
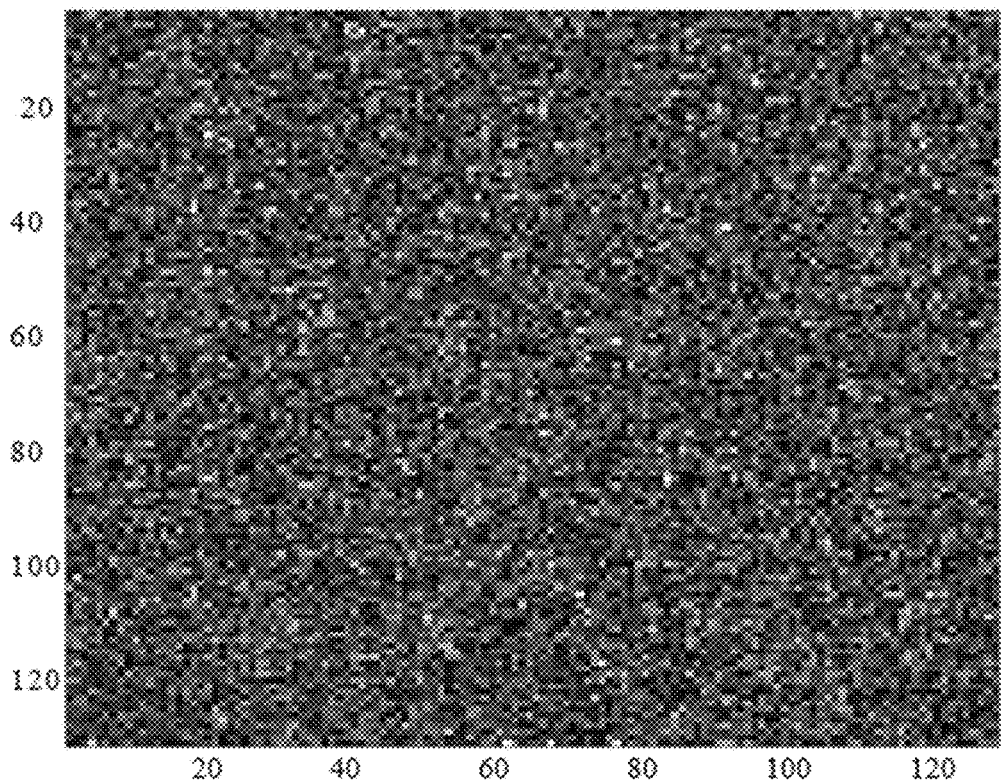
FIG. 35 shows one of three encrypted random binary images. Decryption of the information is carried out with the image decryption keys.
Figure 36:
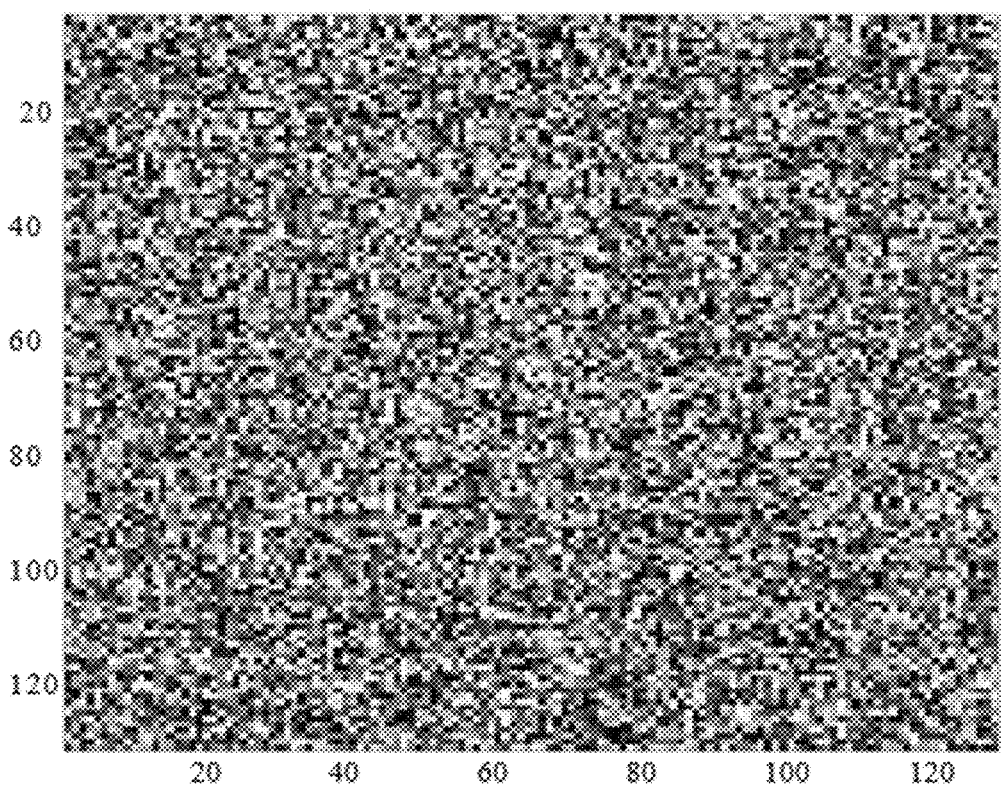
FIG. 36 shows the decrypted random binary image.
Figure 37:
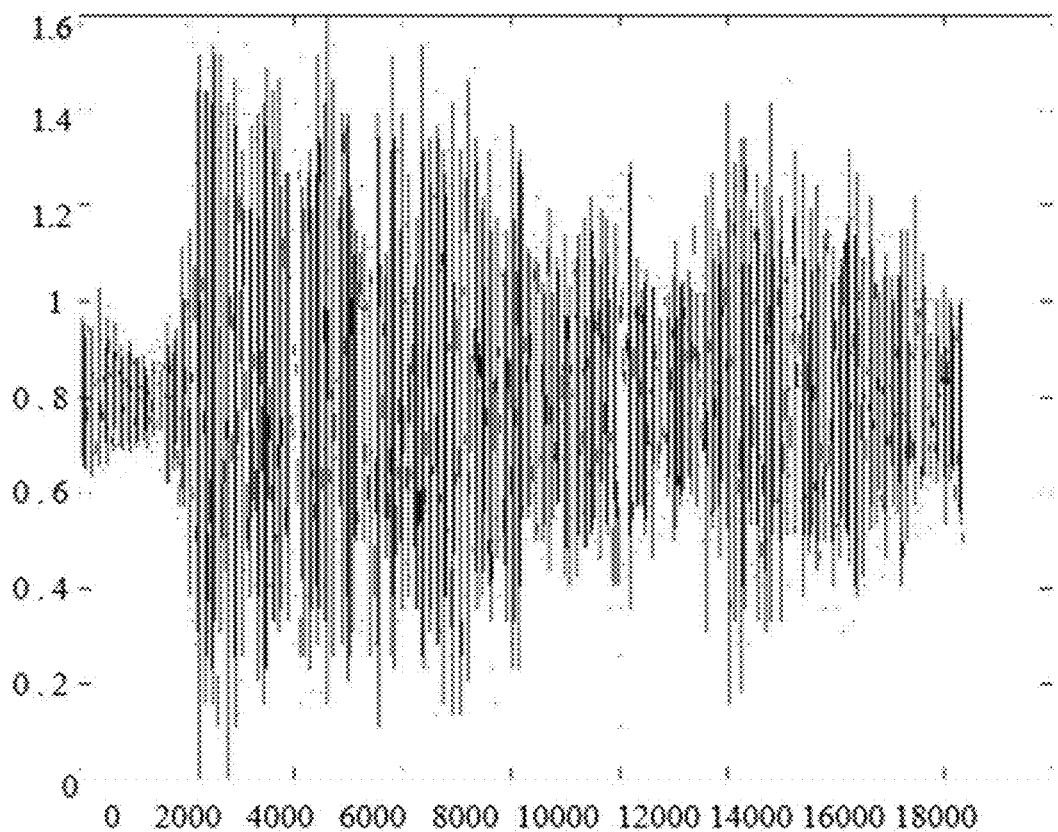
FIG. 37 shows the audio signal of the word 'Hallelujah'.
Figure 38:
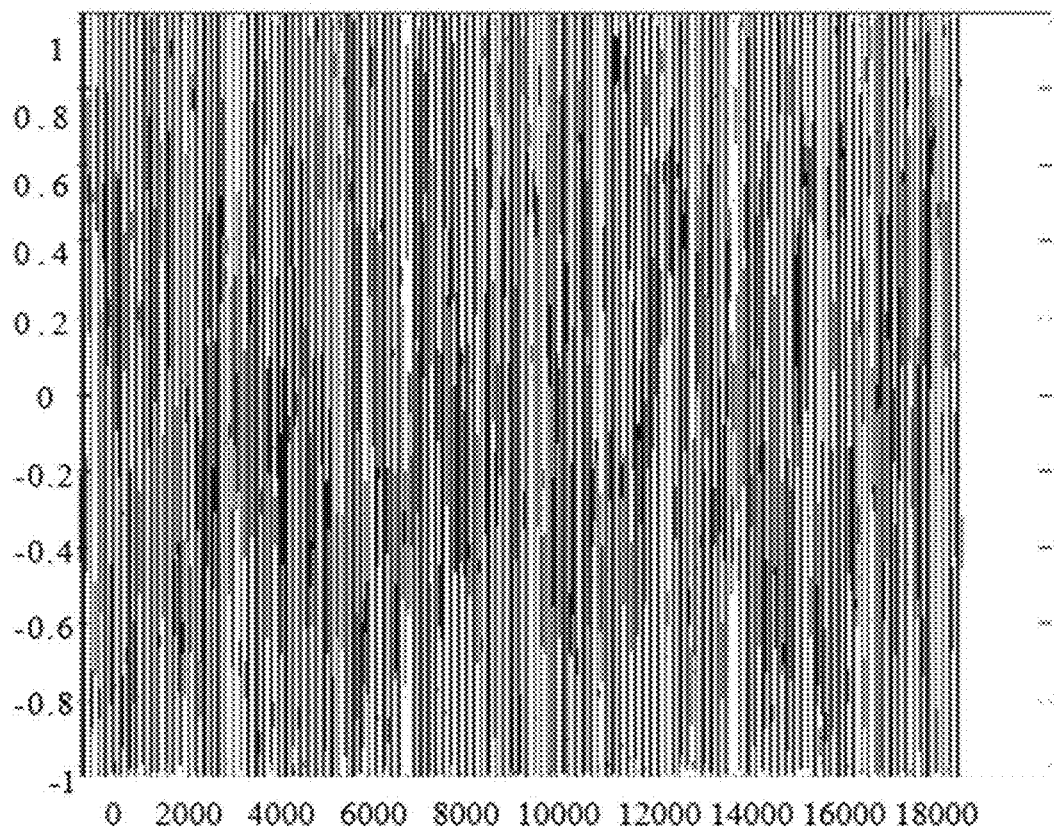
FIG. 38 shows one of the three signal encryption keys.
Figure 39:
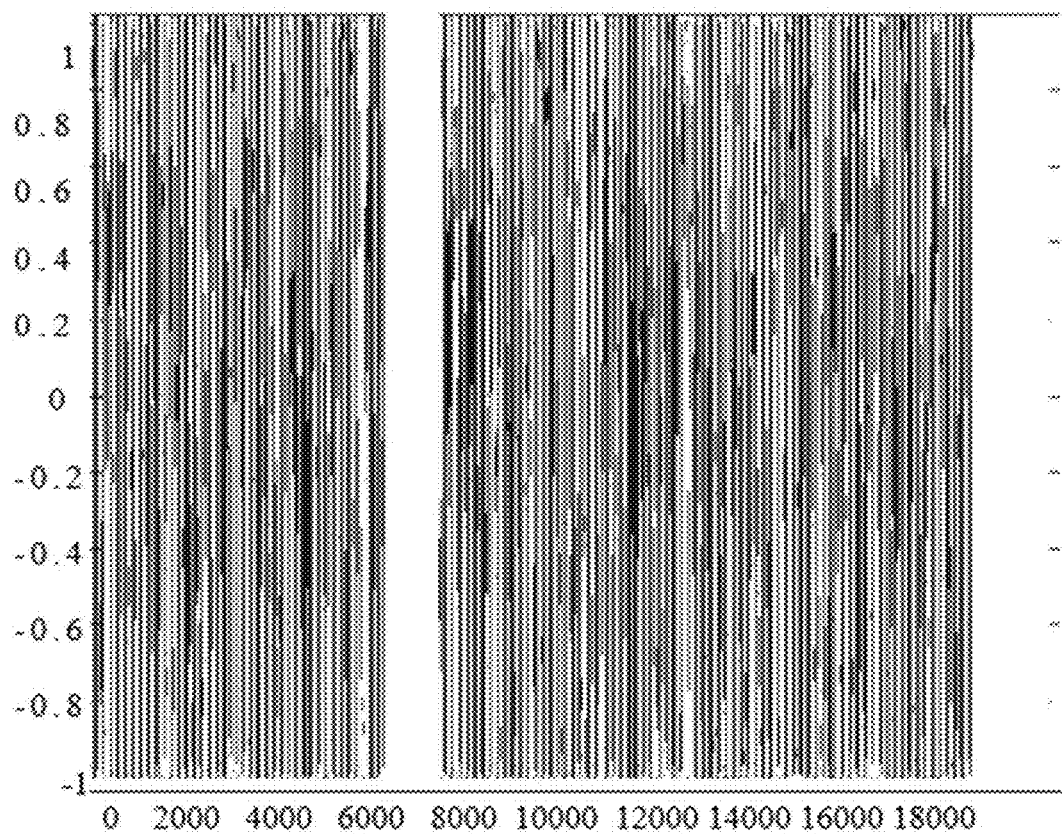
FIG. 39 shows the encrypted audio signal for the word 'Hallelujah'.
Figure 40:
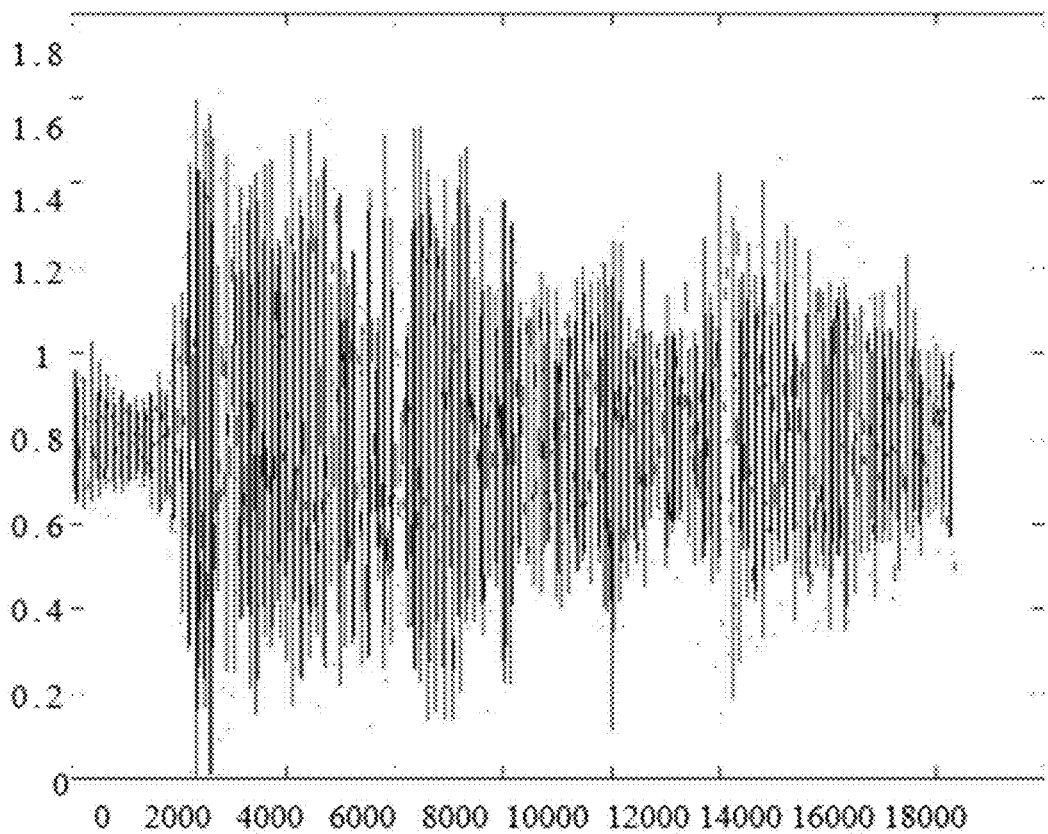
FIG. 40 shows the decrypted audio signal for the word 'Hallelujah'.

Image of Letter G
  FIG. 6A shows the image of Letter G.
  FIG. 6B shows one of the three image encryption keys.
  FIG. 7 shows one of three encrypted images of Letter G. Decryption of the information is carried out with the image decryption keys.
  FIG. 8 shows the decrypted image of Letter G. FIG. 5 and FIG. 8 are visually identical.
Image of Alfred Noble
  FIG. 9 shows the image of Alfred Noble.
  FIG. 10 shows one of the three image encryption keys.
  FIG. 11 shows one of three encrypted images of Alfred Noble. Decryption of the information is carried out with the image decryption keys.
  FIG. 12 shows the decrypted image of Alfred Noble. FIG. 9 and FIG. 12 are visually identical.
Image of Purdue Pete
  FIG. 13 shows the image of Purdue Pete.
  FIG. 14 shows one of the three image encryption keys.
  FIG. 15 shows one of three encrypted images of Purdue Pete. Decryption of the information is carried out with the image decryption keys.
  FIG. 16 shows the decrypted image of Purdue Pete.
  FIG. 13 and FIG. 16 are visually identical.
Image of Girl
  FIG. 17 shows the image of Girl. FIG. 18 shows one of the three image encryption keys. FIG. 19 shows one of three encrypted images of Girl. Decryption of the information is carried out with the image decryption keys. FIG. 20 shows the decrypted image of Girl. FIG. 17 and FIG. 20 are visually identical.
Image of Lena
  FIG. 21 shows the image of Lena.
  FIG. 22 shows one of the three image encryption keys.
  FIG. 23 shows one of three encrypted images of Lena. Decryption of the information is carried out with the image decryption keys.
  FIG. 24 shows the decrypted image of Lena.
  FIG. 21 and FIG. 24 are visually identical.
Image of Phantom
  FIG. 25 shows the image of Phantom.
  FIG. 26 shows one of the three image encryption keys.
  FIG. 27 shows one of three encrypted images of Phantom. Decryption of the information is carried out with the image keys.
  FIG. 28 shows the decrypted image of Phantom.
  FIG. 25 and FIG. 28 are visually identical.
MRI Image
  FIG. 29 shows the MRI image.
  FIG. 30 shows one of the three image encryption keys.
  FIG. 31 shows one of three encrypted MRI images. Decryption of the information is carried out with the decryption image keys.
  FIG. 32 shows the decrypted MRI image. FIG. 29 and FIG. 32 are visually identical.
Random Binary Image
  FIG. 33 shows a random binary image.
  FIG. 34 shows one of the three image encryption keys.
  FIG. 35 shows one of three encrypted random binary images. Decryption of the information is carried out with the image decryption keys.
  FIG. 36 shows the decrypted random binary image.
  FIG. 33 and FIG. 36 are visually identical.
Audio Signal of the Word 'Hallelujah'
  FIG. 37 shows the audio signal of the word 'Hallelujah'.
  FIG. 38 shows one of the three signal encryption keys.
  FIG. 39 shows one of three encrypted random binary signals. Decryption of the information is carried out with the signal decryption keys.
  FIG. 40 shows the decrypted random binary signal.
  FIG. 37 and FIG. 40 are identical. When the signals are run through a sound generator, one clearly hears the same word 'Hallelujah'.

Figure 41:
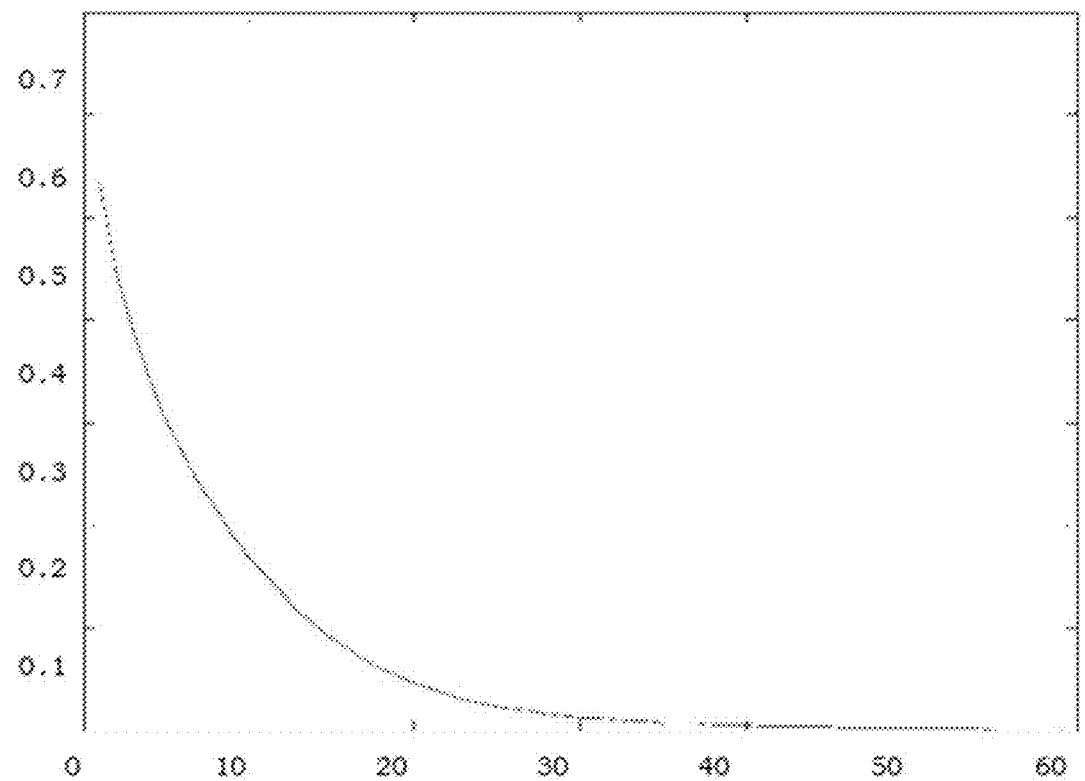
FIG. 41 shows mean square error versus number of iterations of G2.

The method is iterative, going through a number of iterations during which the reconstruction error is minimized. The mean square error versus iterations is always a very smooth curve. An example is shown in FIG. 41.

Encryption/Decryption of Color and Multichannel Images

Figure 42:
FIG. 42 shows an original color image of 'Lena' to be encrypted.
Figure 43:
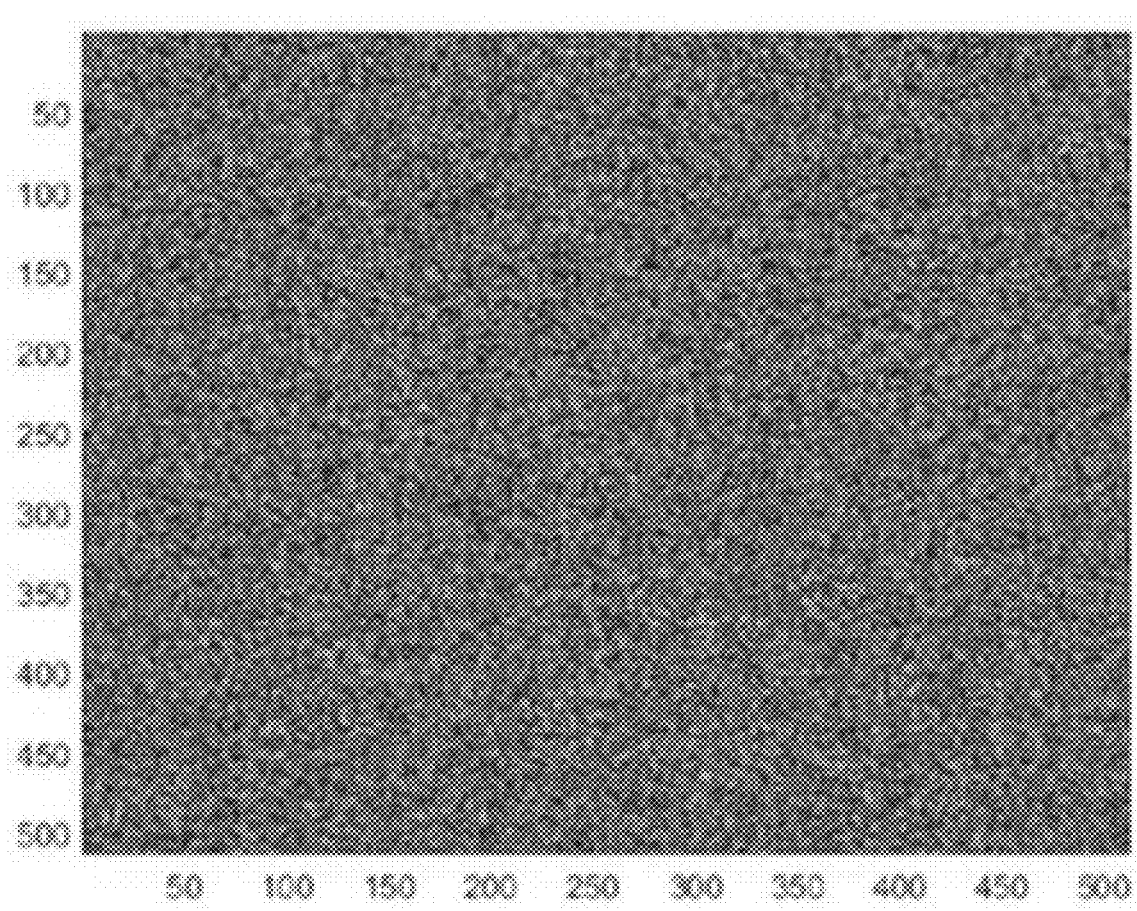
FIG. 43 shows the color image of FIG. 41 with encryption key 2 applied.
Figure 44:
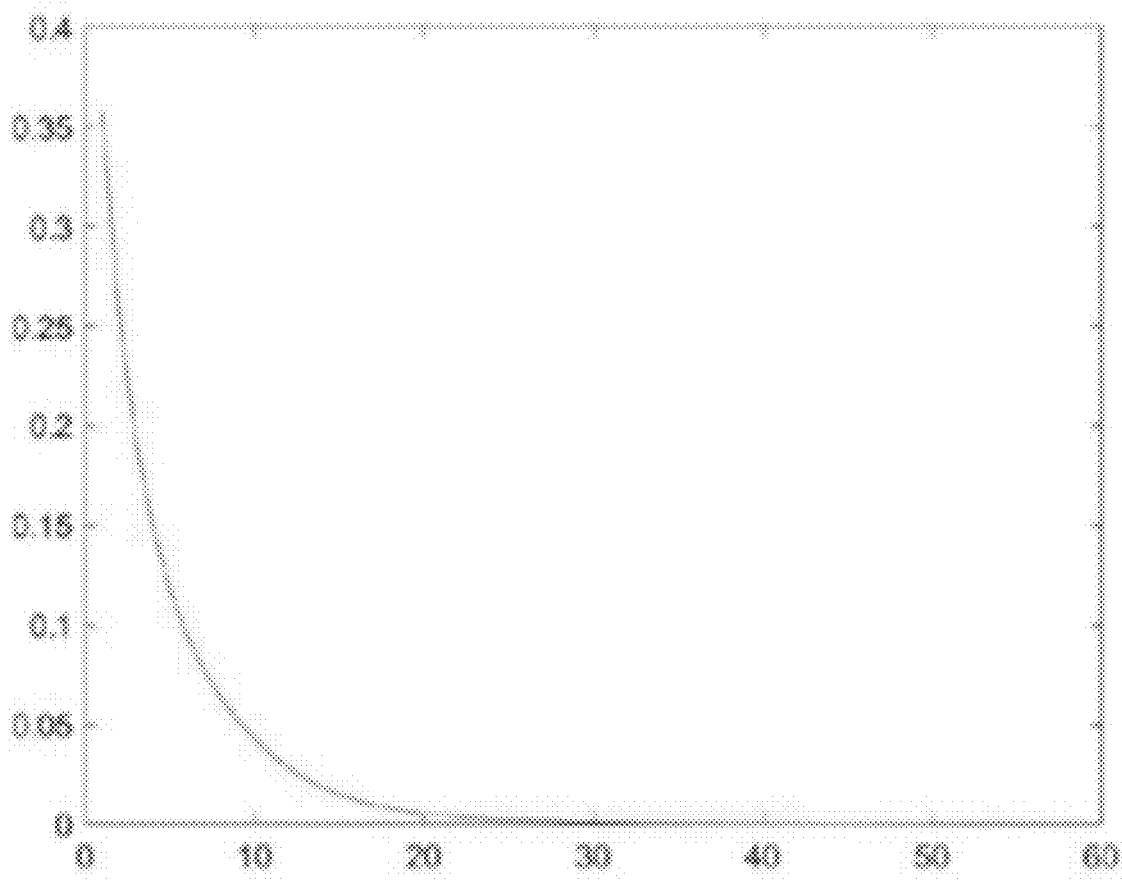
FIG. 44 shows the convergence of G2 during the decryption process.
Figure 45:
FIG. 45 shows the decrypted color image of 'Lena.'
Figure 46:
FIG. 46 shows Bipolar binary key with aperture size of 8×8 pixels.

The encryption/decryption method discussed above is also valid with color images and multichannel images such as multispectral and hyperspectral images. Here the method is applied to each channel as described above. The same keys can be used with all the channels, or each channel has its own keys. An example color image is shown in FIG. 42. It was encrypted with the proposed method. The system implemented is as in FIG. 3C. The amplitude filter (500) and the encryption key (800) were implemented as a single amplitude/phase key. The encrypted color image using the encryption key 2 (300) is shown in FIG. 43. The color image encrypted with key 2 used is shown in FIG. 44. The convergence of G2 is shown in FIG. 44. The decrypted color image is shown in FIG. 45.

Multispectral and hyperspectral images can be encrypted/decrypted in exactly the same manner.

Aperture Sizes and Types of Keys (Masks)

An important issue is the size of the apertures used on each key. In the experimental results discussed so far, the apertures are assumed to be points. With real devices such as an optical system of implementation, each aperture often has a finite size. So it is important, especially with optical implementations, that finite sized apertures do not reduce performance. We claim that G2 functions well with finite aperture sizes as well provided that they are sufficiently small, such as aperture sizes equal to 8×8 pixels.

In general, waves have phase varying between 0 and $2\pi$ radians. This will be referred to as Phase Case II. It is possible to achieve perfect phase recovery with G2 using 2 masks if the wave input is passed through a window with opaque surrounding. This is the minimum number of masks which can be used with G2. For this purpose, we also define Phase Case I in which phase varies between 0 and $T$ radians. In each case, there are also 2 categories. Below we discuss these cases for minimum number of masks.

Phase Case I

There are two major categories. In the first category, the first mask is transparent (no mask). The second mask is preferably a binary mask (even though it can be a complex phase/amplitude mask). The binary mask can be a bipolar (+1 and −1) binary mask. It can also be a pair of complimentary unipolar (+1 and 0) masks. In the second category, the transparent mask is skipped, and a pair of complimentary unipolar (+1 and 0) masks are used. This is the simplest case from a computational point of view. If more number of masks are used, the number of G2 iterations are reduced.

Phase Case II

Here the transparent mask is necessary in all cases in order to use the fewest number of masks. There are two major categories. In the first category, the first mask is transparent (no mask). The other masks are pairs of complimentary unipolar (+1 and 0) masks. In the experiments, we found out that two pairs of unipolar binary masks give the best results. In the second category, the first mask is again transparent (no mask). The second mask is the unipolar binary mask (+1 and −1) or a complex phase mask or a complex phase/amplitude mask.

Encryption/Decryption of Coherent Waves

Coherent waves are usually 3 or 4-dimensional. They are characterized by amplitude and phase. Both types of information can be encrypted by the proposed method. Sensors such as cameras detect intensity proportional to the amplitude of the wave, and thereby phase is lost. By using encryption/decryption keys as discussed in this disclosure together with G2 means simultaneous encryption/decryption of wave information and recovery of lost information (phase).

According to some embodiments, the recovery of the phase may form a perfectly recovered version of the original phase of the original input signal.

According to some embodiments, the recovery of the phase may form a partially recovered version of at least 98 percent, 99 percent, or 99.9 percent of the original phase of the original input signal.

In wave applications, the keys used are simultaneously phase/amplitude masks to make perfect phase recovery possible with G2. Since physical measurements are usually part of the application, it becomes more important to design keys with utmost care.

Figure 47:
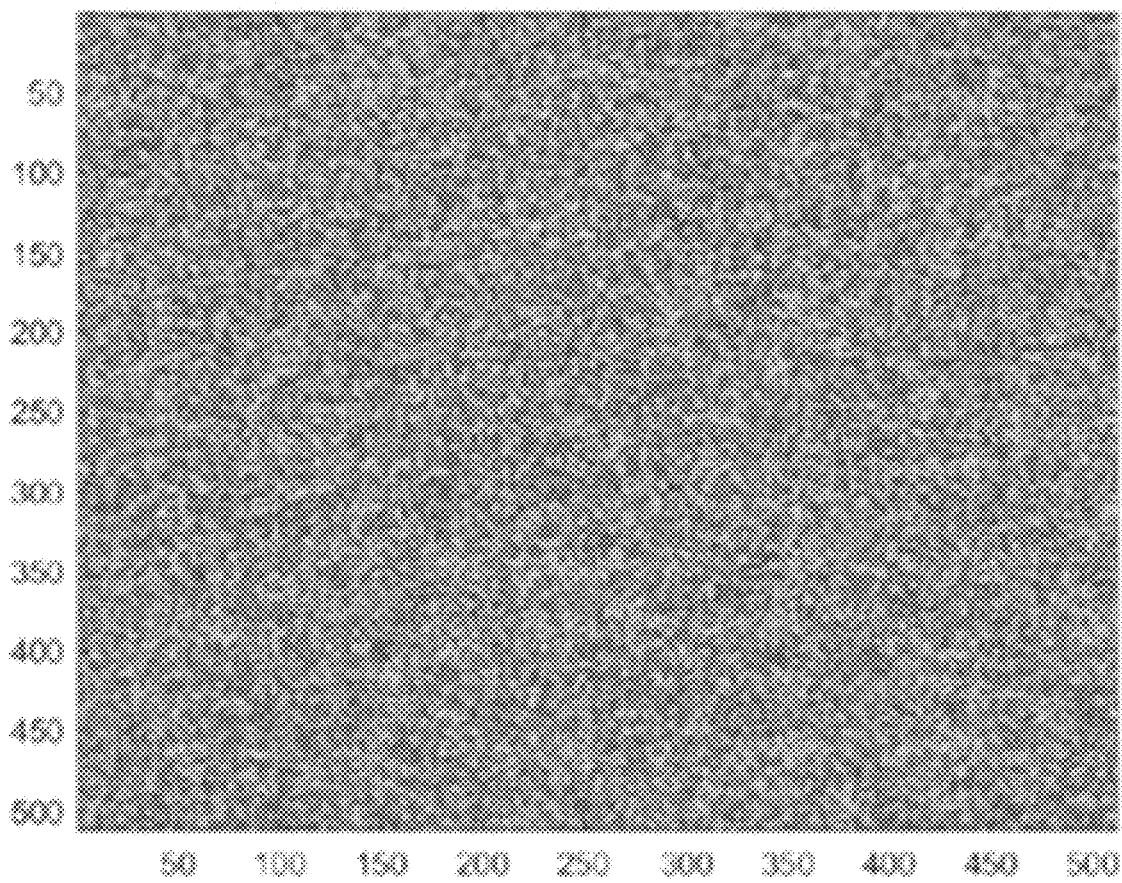
FIG. 47 shows a Spectral image when the input wave is encrypted by a bipolar binary key.
Figure 48:
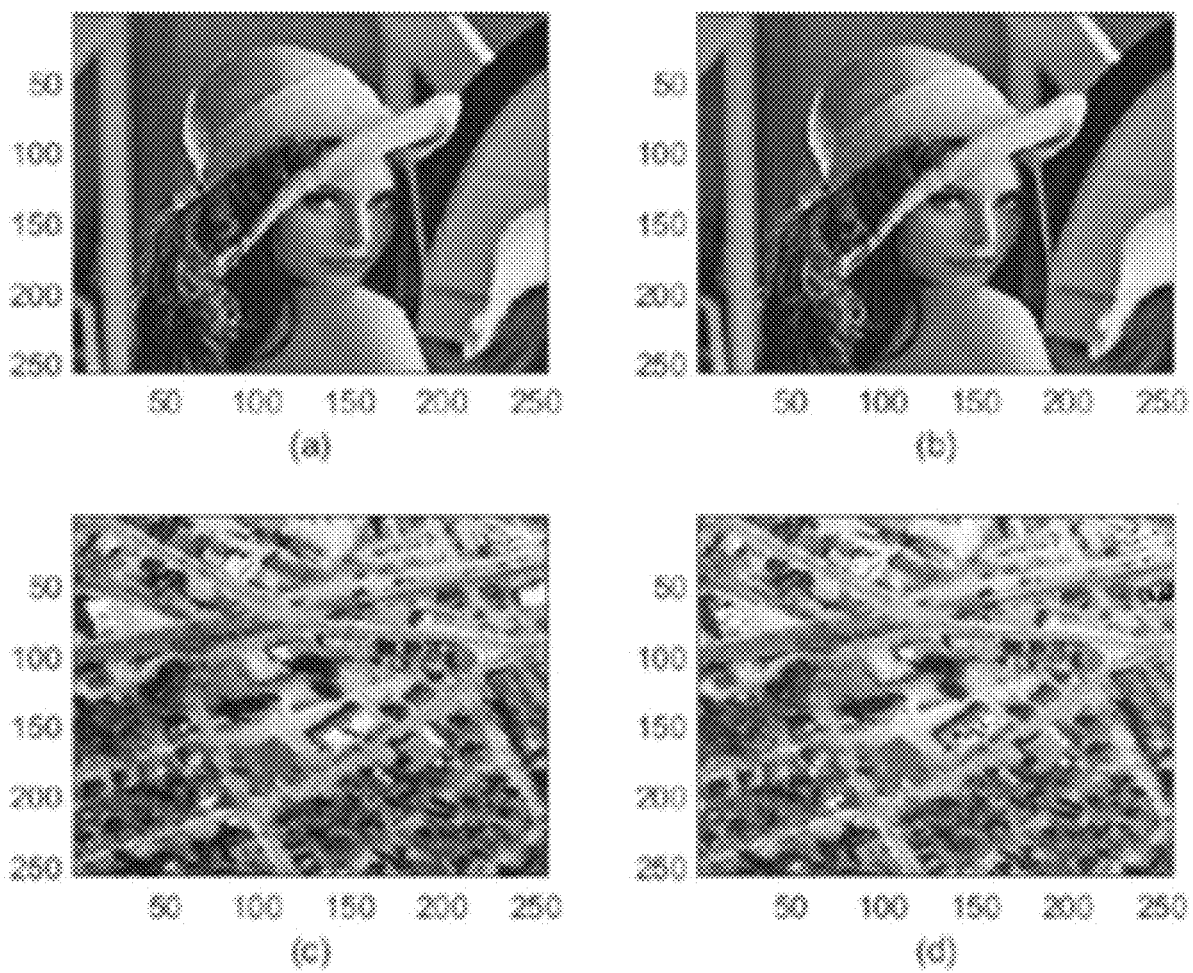
FIG. 48 shows (a) Original wave amplitude image, (b) Decrypted wave amplitude image, (c) Original wave phase image, and (d) Decrypted wave phase image.
Figure 49:
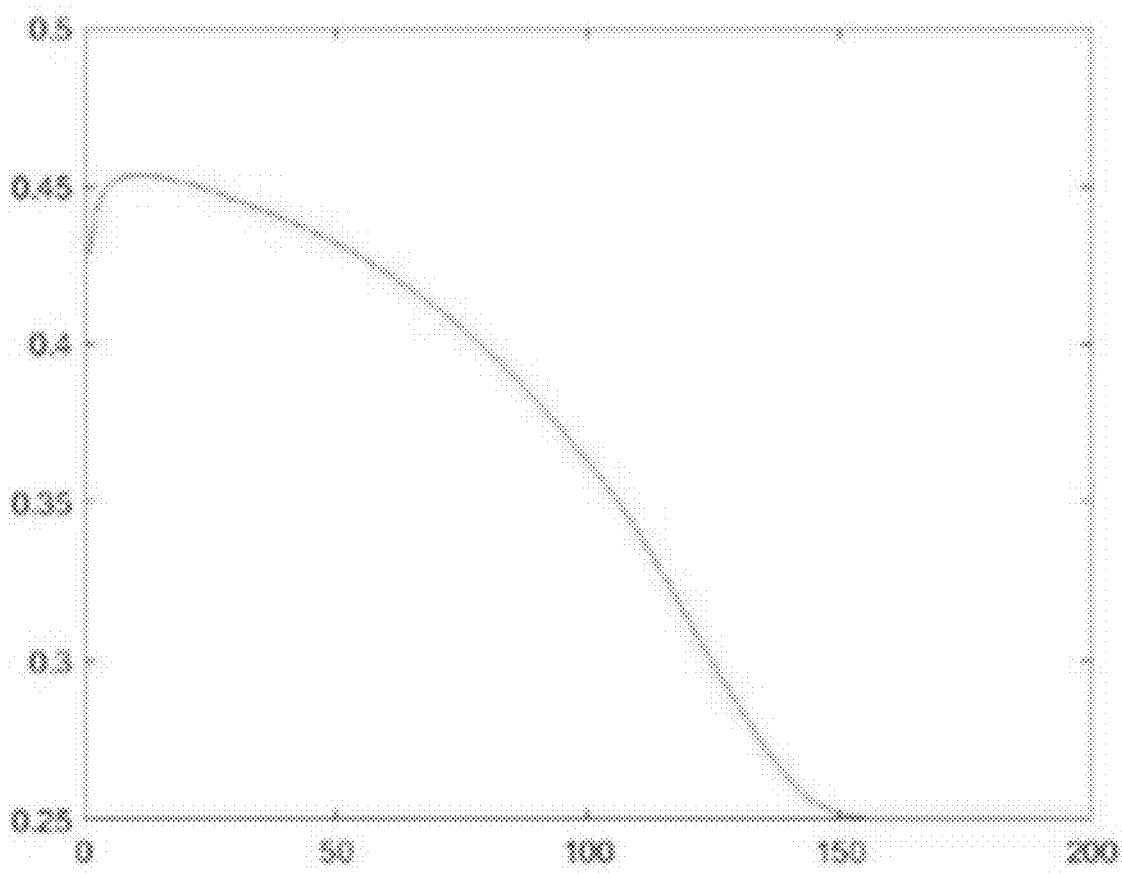
FIG. 49 shows the convergence of G2 during the wave amplitude decryption process.

Below an example of wave encryption/decryption is given when a transparent key and a bipolar binary key is used. FIG. 48 (*a*) and FIG. 48 (*c*) show the amplitude and phase images of the wave used. FIG. 47 shows the encrypted spectral amplitude image when the bipolar binary key is used. FIG. 48 (*b*) and FIG. 48 (*d*) show the decrypted amplitude and phase images of the wave. FIG. 49 shows the convergence curve of G2 during the phase recovery process.

Two-Factor Authentication and Other Designs

G2 encyption/decryption is very safe, but still depends on keys. Since they are typically randomly generated complex matrices, they would be difficult to generate without extra information. They can be periodically changed to add extra security. The key information between a transmitter and receiver can be generated by using ultra-safe two-factor authentication (2FA). For example, a software-generated time-based, one-time passcode can be used for this purpose. Since app-based 2FA solutions are available for mobile, wearables, or desktop platforms, user authentication is possible just about everywhere. For this purpose, the large keys can actually be controlled by a single random number to be generated by 2FA.

Other extra security measures are possible with G2 encryption/decryption. For example, information can be embedded only in amplitude or phase while making the other part noninformative. Phase embedding would be especially attractive since it is more difficult to recover phase information than amplitude information.

CONCLUSIONS

The results presented above are highly encouraging. They show that the method is always effective in achieving an extremely high degree of security, and simultaneously achieve perfect recovery of the original information.

It is expected to be very difficult to attack these results since the method is highly nonlinear.

There are mainly two kinds of cryptography in use in current technology. These are symmetric-key and public-key cryptography (PKC). PKC is usually preferable. The most popular kind of PKC is RSA, which depends on the difficulty of the integer factorization problem. RSA can be shown to be crackable in polynomial time by very powerful computers such as quantum computers. Such a threat is especially serious in machine-to-machine (M2M) context. The present invention could prove to be competitive in such ultrasecure cryptography applications, especially because of its ease of use, nonlinear properties, and current availability as compared to some new approaches often classified under the title 'post-quantum cryptography'. Coupled with two-factor authentication, the G2 encryption/decryption system is indeed very secure, especially in processing big data.

Computing Device

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled, or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 50:
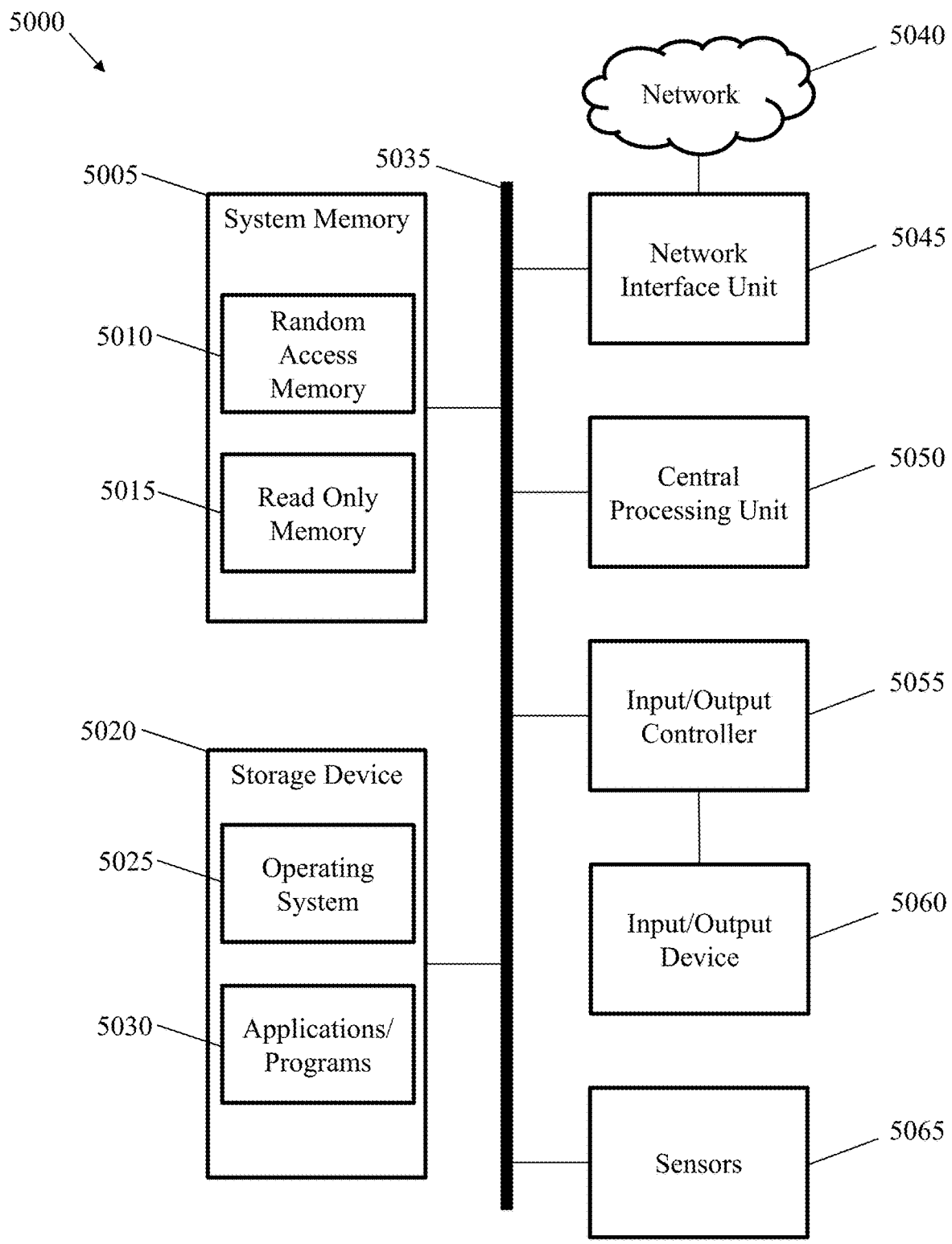
FIG. 50 depicts an exemplary computing device that aspects of the present invention may operate on and/or reside upon.

FIG. 50 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 50 depicts an illustrative computer architecture for a computer 5000 for practicing the various embodiments of the invention. The computer architecture shown in FIG. 50 illustrates a conventional personal computer, including a central processing unit 5050 ("CPU"), a system memory 5005, including a random access memory 5010 ("RAM") and a read-only memory ("ROM") 5015, and a system bus 5035 that couples the system memory 5005 to the CPU 5050. A basic input/output system containing the basic routines that help to transfer information between elements within the computer, such as during startup, is stored in the ROM 5015. The computer 5000 further includes a storage device 5020 for storing an operating system 5025, application/program 5030, and data.

The storage device 5020 is connected to the CPU 5050 through a storage controller (not shown) connected to the bus 5035. The storage device 5020 and its associated computer-readable media provide non-volatile storage for the computer 5000. Although the description of computer-readable media contained herein refers to a storage device, such as a hard disk or CD-ROM drive, it should be appreciated by those skilled in the art that computer-readable media can be any available media that can be accessed by the computer 5000.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 5000 may operate in a networked environment using logical connections to remote computers through a network 5040, such as TCP/IP network such as the Internet or an intranet. The computer 5000 may connect to the network 5040 through a network interface unit 5045 connected to the bus 5035. It should be appreciated that the network interface unit 5045 may also be utilized to connect to other types of networks and remote computer systems.

The computer 5000 may also include an input/output controller 5055 for receiving and processing input from a number of input/output devices 5060, including a keyboard, a mouse, a touchscreen, a camera, a microphone, a controller, a joystick, or other type of input device. Similarly, the input/output controller 5055 may provide output to a display screen, a printer, a speaker, or other type of output device. The computer 5000 can connect to the input/output device 5060 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 5020 and/or RAM 5010 of the computer 5000, including an operating system 5025 suitable for controlling the operation of a networked computer. The storage device 5020 and RAM 5010 may also store one or more applications/programs 5030. In particular, the storage device 5020 and RAM 5010 may store an application/program 5030 for providing a variety of functionalities to a user. For instance, the application/program 5030 may comprise many types of programs such as a word processing application, a spreadsheet application, a desktop publishing application, a database application, a gaming application, internet browsing application, electronic mail application, messaging application, and the like. According to an embodiment of the present invention, the application/program 5030 comprises a multiple functionality software application for providing word processing functionality, slide presentation functionality, spreadsheet functionality, database functionality and the like.

The computer 5000 in some embodiments can include a variety of sensors 5065 for monitoring the environment surrounding and the environment internal to the computer 5000. These sensors 5065 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

What is claimed is:

1. A method for improving information security of an input signal, the method comprising:
    encrypting the input signal, based on concurrently executing a plurality of sequences of transformations of the input signal, and for each sequence of the plurality of sequences:
        (i) performing a discrete Fourier transform on the input signal;
        (ii) removing phase information from the input signal, while preserving, on the spectral plane, amplitude information of the input signal; and
        (iii) ciphering the input signal based on a unique key that corresponds to the sequence,
    wherein executing each one of the sequences produces a corresponding encrypted data signal, and recreation of the input signal requires each of the encrypted data signals and the corresponding unique key.

2. The method of claim 1, wherein the encrypting is performed by a processor or a spatial light modulator (SLM) and associated optics.

3. The method of claim 1, further comprising increasing processing speed of the Fourier transform by zero padding the input signal.

4. The method of claim 1, wherein the encrypting is performed non-linearly.

5. The method of claim 1, wherein, within a first sequence of the plurality of sequences, the discrete Fourier transform is performed before removing the phase information.

6. The method of claim 5, wherein, within the first sequence of the plurality of sequences, the ciphering is performed after removing the phase information.

7. The method of claim 6, wherein, within remaining sequences of the plurality of sequences, the ciphering is performed before the discrete Fourier transform.

8. The method of claim 7, wherein, within the remaining sequences of the plurality of sequences, the step of removing the phase information is performed after the discrete Fourier transform.

9. The method of claim 8, wherein the plurality of sequences are three sequences.

10. A decryption method, comprising:
receiving a plurality of encrypted data signals without phase information;
deciphering each encrypted data signal of the plurality of encrypted data signals, based on a unique key that corresponds to the encrypted data signal, to produce a plurality of deciphered data signals; and
performing recovery of phase of an original input signal associated with the encrypted signals in an iterative manner and including averaging the deciphered data signals, wherein the recovery of the phase forms a partially recovered version of at least 98 percent of an original phase of the original input signal.

11. The method of claim 10, wherein the deciphering is performed by a processor or a spatial light modulator (SLM) and associated optics.

12. The method of claim 10, wherein the recovery of the phase forms a partially recovered version of at least 99 percent of an original phase of the original input signal.

13. The method of claim 10, wherein the recovery of the phase forms a partially recovered version of at least 99.9 percent of an original phase of the original input signal.

14. The method of claim 10, further comprising deciphering each encrypted data signal based on an inverse of the unique key.

15. The method of claim 14, wherein the step of performing recovery of the phase includes performing a discrete inverse Fourier transform on each of the deciphered data signals.

16. The method of claim 15, wherein the step of performing recovery of the phase includes assigning random or pseudorandom phases to each of the deciphered data signals.

17. An encryption system for improving information security of an input signal, the encryption system comprising:
an encryption unit configured to encrypt the input signal, based on concurrent execution of a plurality of sequences of transformations of the input signal, and for each sequence of the plurality of sequences:
(i) perform a discrete Fourier transform on the input signal;
(ii) remove phase information from the input signal and preserve, on the spectral plane, amplitude information of the input signal; and
(iii) cipher the input signal based on a unique key that corresponds to the sequence,
wherein the execution of each one of the sequences produces a corresponding encrypted data signal, and recreation of the input signal requires each of the encrypted data signals and the corresponding unique key.

18. The system of claim 17, wherein the encryption unit comprises a processor or a spatial light modulator (SLM) and associated optics.

19. A decryption system for improving information security of encrypted data signals, the decryption system comprising:
a decryption unit configured to receive a plurality of encrypted data signals without phase information;
deciphering, by the decryption unit, each encrypted data signal of the plurality of encrypted data signals, based on a unique key that corresponds to the encrypted data signal, to produce a plurality of deciphered data signals; and
performing recovery of phase of an original input signal associated with the encrypted signals in an iterative manner and including averaging the deciphered data signals, wherein the recovery of the phase forms a partially recovered version of at least 98 percent of an original phase of the original input signal.

20. The system of claim 19, wherein the decryption unit may include a processor or a spatial light modulator (SLM) and associated optics.

* * * * *